(12) United States Patent
Chauhan et al.

(10) Patent No.: US 11,395,314 B2
(45) Date of Patent: Jul. 19, 2022

(54) OPTIMAL SCHEDULING OF ACCESS EVENTS ON MOBILE DEVICES

(71) Applicant: T-Mobile USA, Inc., Bellevue, WA (US)

(72) Inventors: Kanakrai Chauhan, Snoqualmie, WA (US); Ankit Awasthi, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/094,732

(22) Filed: Nov. 10, 2020

(65) Prior Publication Data

US 2021/0084670 A1    Mar. 18, 2021

Related U.S. Application Data

(63) Continuation-in-part of application No. 16/991,960, filed on Aug. 12, 2020, and a continuation-in-part of
(Continued)

(51) Int. Cl.
*H04W 72/12* (2009.01)
*H04W 4/60* (2018.01)
(Continued)

(52) U.S. Cl.
CPC ......... *H04W 72/1242* (2013.01); *H04L 67/62* (2022.05); *H04W 4/50* (2018.02);
(Continued)

(58) Field of Classification Search
CPC ..... H04W 72/1242; H04W 4/60; H04W 4/50; H04W 72/1252; H04W 72/1257; H04W 72/1273; H04W 72/1289; H04L 67/325
(Continued)

(56) References Cited

U.S. PATENT DOCUMENTS 8,307,110 B1    11/2012  Katzer et al.
9,264,842 B1 *   2/2016  Sumner ................. H04W 8/245
(Continued)

FOREIGN PATENT DOCUMENTS

WO    2001049027 A1    7/2001
WO    2002062009 A1    8/2002

OTHER PUBLICATIONS

Canadian Patent Application No. 3,071,478, Office Action dated Apr. 1, 2021, 5 pages.
(Continued)

*Primary Examiner* — Tan Doan
(74) *Attorney, Agent, or Firm* — Han Santos, PLLC

(57) ABSTRACT

Described herein are techniques for optimizing scheduling of access events (e.g., downloads) on mobile devices based on server congestion. In some embodiments, response times are monitored for a number of servers at various times to establish availability patterns for those servers. An indication of a number of software applications installed upon a mobile device is used to identify a number of access events to be associated with that mobile device. The servers associated with those access events are identified and an access schedule is generated based on the availability patterns. The access schedule is then provided to the mobile device, which initiates execution of the access events according to the access schedule.

19 Claims, 13 Drawing Sheets

Related U.S. Application Data application No. 16/991,950, filed on Aug. 12, 2020, which is a continuation-in-part of application No. 16/749,866, filed on Jan. 22, 2020, now abandoned, said application No. 16/991,960 is a continuation-in-part of application No. 16/749,866, filed on Jan. 22, 2020, now abandoned.

(60) Provisional application No. 62/802,130, filed on Feb. 6, 2019.

(51) Int. Cl.
*H04W 4/50* (2018.01)
*H04L 67/62* (2022.01)

(52) U.S. Cl.
CPC ......... *H04W 4/60* (2018.02); *H04W 72/1252* (2013.01); *H04W 72/1257* (2013.01); *H04W 72/1273* (2013.01); *H04W 72/1289* (2013.01)

(58) Field of Classification Search
USPC ....................................................... 709/217
See application file for complete search history.

(56) References Cited

U.S. PATENT DOCUMENTS

| | | | |
|---|---|---|---|
| 9,282,362 | B2 | 3/2016 | Ellis |
| 9,544,388 | B1 | 1/2017 | Li et al. |
| 2001/0052006 | A1 | 12/2001 | Barker et al. |
| 2002/0156911 | A1 | 10/2002 | Croman et al. |
| 2003/0221191 | A1 | 11/2003 | Khusheim |
| 2005/0120040 | A1* | 6/2005 | Williams ................ H04L 67/34 |
| 2006/0064476 | A1 | 3/2006 | Decasper et al. |
| 2007/0136761 | A1 | 6/2007 | Basmajian et al. |
| 2008/0139189 | A1 | 6/2008 | Hyatt |
| 2009/0138480 | A1* | 5/2009 | Chatley ................... G06F 3/067 |
| 2012/0023190 | A1 | 1/2012 | Backholm et al. |
| 2012/0221687 | A1 | 8/2012 | Hunter et al. |
| 2013/0018990 | A1 | 1/2013 | Cai et al. |
| 2013/0150015 | A1 | 6/2013 | Valkó et al. |
| 2015/0088890 | A1 | 3/2015 | Hoffert et al. |
| 2017/0308714 | A1 | 10/2017 | Drost-Hansen et al. |

OTHER PUBLICATIONS

U.S. Appl. No. 16/749,866, Final Office Action dated Jun. 30, 2021, 21 pages.
U.S. Appl. No. 16/991,950, Office Action dated Jul. 23, 2021, 33 pages.
U.S. Appl. No. 16/991,960 Office Action dated Aug. 9, 2021, 40 pages.
U.S. Appl. No. 16/749,866, Non-Final Office Action dated Feb. 4, 2021, 21 pages.
European Patent Application No. 20155734.5, Extended European Search Report dated Jul. 10, 2020, 7 pages.
Canadian Patent Application No. 3,071,478, Office Action dated Jan. 31, 2022, 4 pages.
European Patent Application No. 21190864.5, Search Report dated Jan. 7, 2022, 8 pages.
U.S. Appl. No. 16/991,950, Final Office Action dated Nov. 12, 2021, 18 pages.
U.S. Appl. No. 16/991,950, Notice of Allowance dated Feb. 14, 2022, 18 pages.
U.S. Appl. No. 16/991,960 , Final Office Action dated Nov. 23, 2021, 22 pages.
U.S. Appl. No. 16/991,960, Notice of Allowance dated Jun. 1, 2022, 25 pages.

* cited by examiner

OPTIMAL SCHEDULING OF ACCESS EVENTS ON MOBILE DEVICES

CROSS-REFERENCE TO RELATED APPLICATIONS

This application is a continuation in part of U.S. patent application Ser. No. 16/991,950, filed on Aug. 12, 2020, entitled "Deployment Ready Techniques for Distributed Application Clients," as well as a continuation in part of U.S. patent application Ser. No. 16/991,960, filed on Aug. 12, 2020, entitled "Client Side Behavior Self-Determination," both of which are continuations in part of U.S. patent application Ser. No. 16/749,866, filed on Jan. 22, 2020, entitled "Rules-Based Just-In-Time Mobile Content Service," which is claims priority to U.S. Provisional Patent Application No. 62/802,130, filed on Feb. 6, 2019, entitled "Rules-Based Just-In-Time Mobile Content." Each of the above applications are hereby incorporated by reference in their entirety.

BACKGROUND

Mobile users demand multimedia streaming. Today, "multimedia streaming" often refers to retrieving and rendering video and audio from a data store, commonly via the internet. While some refer to "multimedia data" as content from multiple forms of media including text, still images, video, and audio, the term is sometimes used synonymously with video and audio content, and perhaps to a lesser extent, still images. One of the reasons for this association is that still images, music, podcasts, and video (with audio) make heavy use of computing, computer-readable memory, and network resources. As used throughout this description, "multimedia" is not restricted to video and audio content.

Streaming multimedia that changes over time (such as video and audio) over a network particularly creates technical issues in computing, computer-readable memory, and network resource management, to name a few. For instance, the quality of multimedia content is a function of network bandwidth. Higher resolution multimedia content generally makes use of more space, memory, and/or bandwidth than lower resolution multimedia content. For example, a data frame for a 4K video is much larger than that of a 720i image. However, if the network struggles to accommodate multimedia data frames with consistent timing, the user experience during playback of the multimedia content while streaming may not be acceptable.

Multimedia streaming may be performed, e.g., on set-top boxes and personal computers, which render multimedia content on relatively large form factors and which have access to relatively large amounts of computing resources, computer-readable memory, bandwidth, and power. These may be used to implement certain technical solutions to ensure smooth and timely renderings of multimedia at high resolutions, incorporating an assumption that the large-form-factor device will be connected to a persistent source of power and unlimited network (e.g., Internet) source of multimedia content, such that pre-loading multimedia content (especially partial files on demand ("data on demand")) on the device may not be significant enough to consider. However, mobile devices, which have relatively smaller form factors and less computing resources, computer-readable memory, bandwidth, and power are not in some instances able to make use of those solutions. Therefore, for small-form-factor devices, the benefits of data-on-demand solutions can be significant enough to consider.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In one or more embodiments, techniques are provided to implement scheduling of software updates onto mobile devices based on learned server congestion patterns. The disclosed techniques, while considered particularly advantageous in a mobile environment, nonetheless may be applicable, in whole or in part, to some stationary user devices, and potentially even those having large form factors. In some embodiments, an RBJIT engine ("RBJIT") may collect from the mobile device information about software applications installed upon the mobile device. Additionally, the RBJIT may monitor network traffic in relation to a number of different servers that provide backend support to various mobile applications. The RBJIT may then learn (e.g., using machine learning techniques) availability patterns for each of the respective servers. When a software update needs to be obtained by a mobile device, the learned availability pattern is used to determine one or more time windows during which the software update should be downloaded that will result in optimizing a load on the server.

Figure 1:
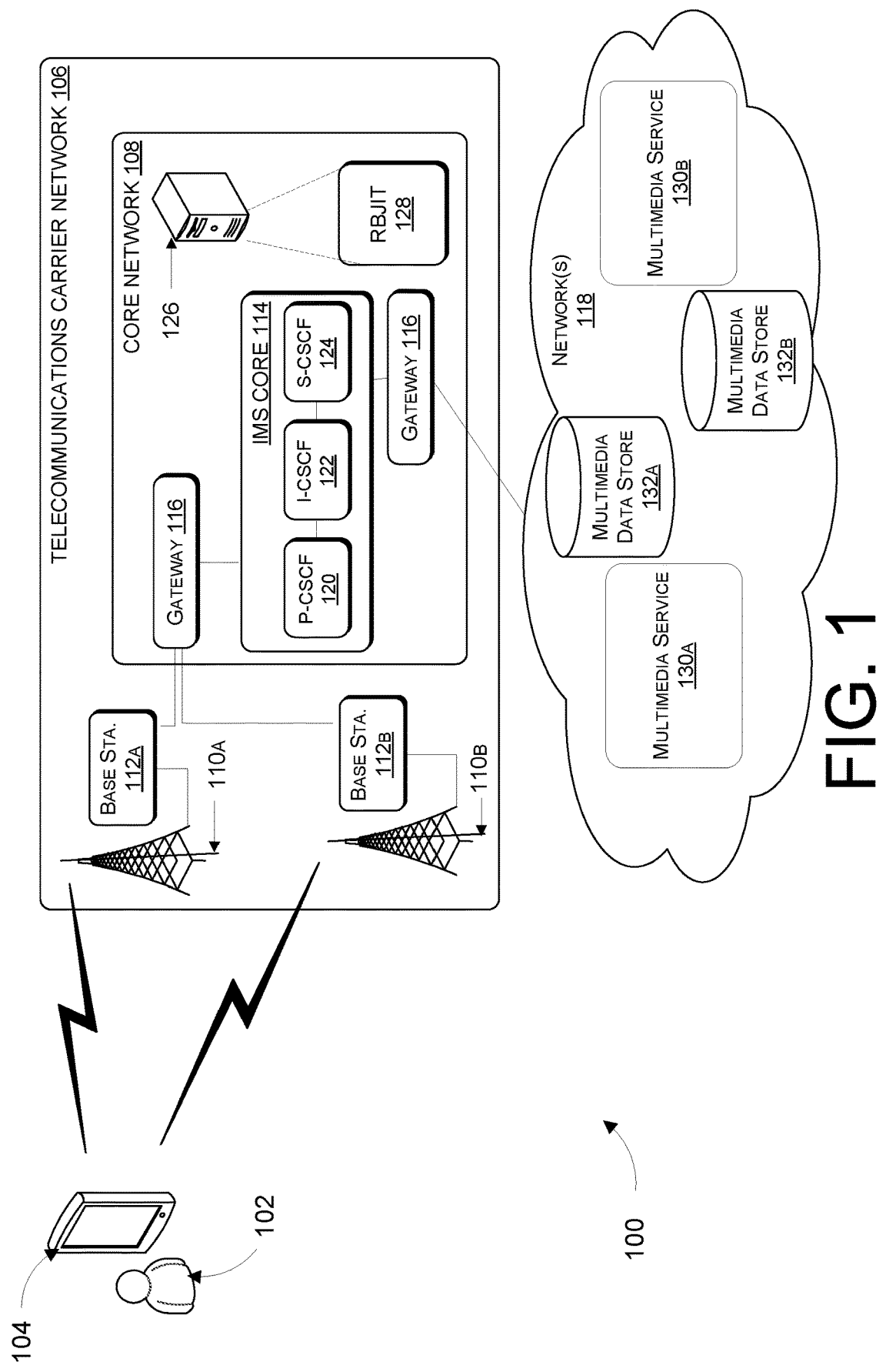
FIG. 1 illustrates an example system to implement rules-based just-in-time multimedia content servicing.

FIG. 1 illustrates an example system 100 to implement rules-based just-in-time multimedia content servicing. In FIG. 1, a user 102 has a mobile device 104. The mobile device 104 is configured to communicate over a telecommunications carrier network 106 which includes a core network 108 of a mobile network operator (MNO). In some embodiments, the telecommunications carrier network is a cellular network and the MNO is a cellular provider. Mobile devices 104 on a cellular network such as the telecommunications carrier network 106 connect via cellular antennas such as antennas 110a and 110b over radio via a cellular air interface to a core network 108 of a mobile network operator (MNO).

In some embodiments, the antennas 110a and 110b may feed to one or more base stations 112a and 112b, which then may access the core network 108 over a wired connection known as a backhaul. The backhaul is often comprised of fiber optic communications cables, although no limitation should be inferred. A portion of the telecommunications carrier network 106 that includes the antennas, cell towers, and base stations may transfer signals from the mobile device 104 to the core network 108, i.e. providing access to the core network 108. Therefore, this portion of the telecommunications carrier network 106 is sometimes called the access network.

In 4G and later embodiments, the core network 108 may include an IP Multimedia Subsystem (IMS) core 114. The IMS core 114 may be accessed via one or more gateways (two gateways 116a and 116b are shown by way of example) and related components that are tasked with providing connectivity between the telecommunications carrier network 106 and mobile devices such as the mobile device 104, by acting as a point of entry and exit for data traffic. In turn, the IMS core 114 may provide the user devices with data access to external packet data networks 118, such as the networks of other telecommunications carrier networks or the Internet.

The IMS core 114 may include a Proxy Call Session Control Function (P-CSCF) 120 or an equivalent function. The P-CSCF 120 may route incoming Session Initiation Protocol (SIP) messages to an IMS registrar server. The P-CSCF 120 may also safeguard the security of the IMS core 114 by handling Internet Protocol Security (IPSec) for communications that are exchanged with mobile devices. In some alternative instances, instead of SIP sessions, the P-CSCF 120 may handle Remote Authentication Dial-In User Service (RADIUS) sessions. The P-CSCF 120 may interact with an Interrogating CSCF (I-CSCF) 122 and a Serving CSCF (S-CSCF) 124. In some instances, the I-CSCF 122 may be an inbound SIP proxy server of the IMS core 114. During IMS registration of the mobile device 104, the I-CSCF 122 may query a home subscriber server (HSS) to designate an S-CSCF 124 to service the mobile device 104. The I-CSCF 122 may be further responsible for routing incoming IMS session requests and terminating IMS sessions requests.

The core network 108 also may include one or more application servers, including without limitation an enterprise information technology (EIT) server 126, to implement application servers, perform back end processing for network connectivity for the MNO (including accessing of multimedia in some embodiments), and host an RBJIT 128 in the core network 106 in some embodiments. The core network 108 may additionally provide a staging function in order to assist with software updates, as will be discussed in further detail below. The staging function may be hosted on the EIT server 126 itself, or the staging function may be provided on its own separate server (e.g. a staging server). In various embodiments the staging function may provide one or more staging locations comprising computer storage for receiving and transmitting software updates.

The core network 108 is the portion of the telecommunications carrier network 106 where routing, billing, policy implementation and other communications services may be implemented by, for example, a Policy and Charging Rules Function (PCRF) or another equivalent rules engine and/or billing function, which may be hosted on the EIT server 126 in some embodiments. For example, a billing function may enable the telecommunications carrier network 106 to monitor services, such as data, voice, text, etc., that are used by subscribers of the telecommunications carrier network 106 and charge the subscribers and/or other parties in real-time based on service usage. In various embodiments, the billing function may be an Online Charging System (OCS) or another equivalent core network component of the telecommunications carrier network 106.

In some embodiments, the RBJIT 128 interfaces via the network 118 with one or more multimedia services (in FIG. 1, two multimedia services 130a and 130b are shown by way of example). The multimedia services 130a and 130b may have their own respective data stores 132a and 132b of multimedia content. The multimedia services 130a and 130b may be commercial services each with their own independent billing system and subscription account system with the user 102. Accordingly, the multimedia services 130a and 130b may have their own surfacing algorithms. In at least some embodiments, surfacing and analysis of first- and third-party content may support NB testing related to both new and existing content. While the RBJIT 128 may collect information from the multimedia services 130a and 130b, the operation of the RBJIT 128 may be independent of the multimedia services 130a and 130b. Therefore, the RBJIT 128 may implement its data on demand technique to surface only a limited amount of required data supplied by the multimedia services 130a and 130b as well.

Figure 2:
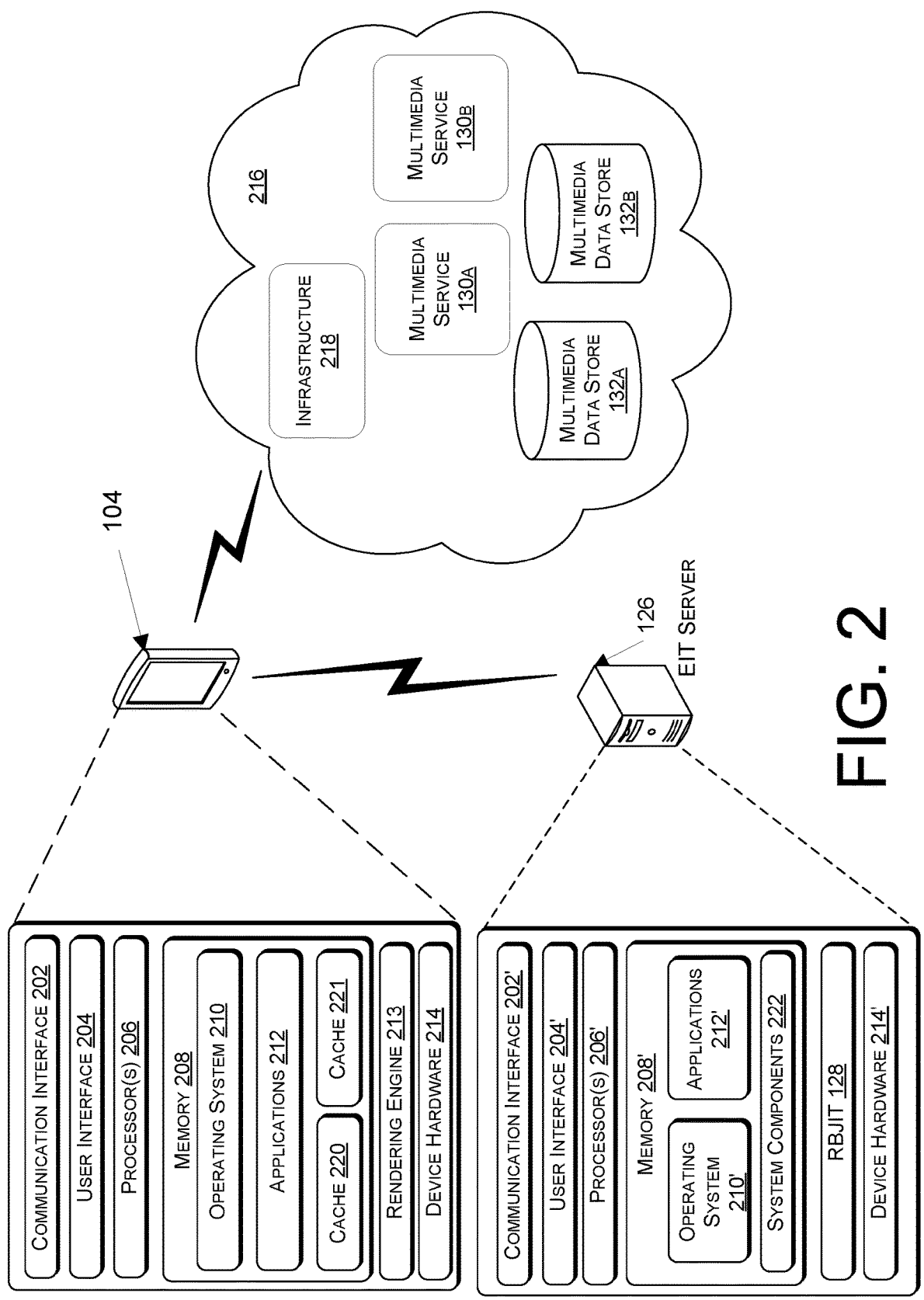
FIG. 2 shows an example of a mobile device on the client side.

In some embodiments, the RBJIT 128 also receives usage and behavior data for the user 102 via the mobile device 104. Functionality for elements of a cellular network and user equipment for the RBJIT service described herein, as well as mobile application management, are generally hosted on computing devices. FIG. 2 shows an example of the mobile device 104 on the client side and the EIT server on the server side.

Exemplary mobile devices 104 include without limitation smaller laptops, embedded devices, tablet computers, and smartphones which have relatively smaller form factors than larger devices such as larger laptops, smart televisions, and personal computer monitors (including all-in-ones). Thus, there may be limited screen space for viewing content, browsing, and configuring the mobile device 104.

The mobile device 104 may have a communication interface 202, a user interface 204, one or more processors 206, and a computer readable memory 208. The communication interface 202 may be a network interface card supporting Ethernet and/or Wi-Fi and/or any number of other physical and/or datalink protocols. Generally, the network will include a cellular network. Accordingly, the communication interface 202 will include a cellular radio and radio access software layer. The user interface 204 may enable a user to provide input and receive output from the mobile device 104, including for example providing one or more input to initiate device activation. The user interface 204 may include a data output device (e.g., visual display, audio speakers) and one or more data input devices. The data input devices may include, but are not limited to, combinations of one or more of touch screens, physical buttons, cameras, fingerprint readers, keypads, keyboards, mouse devices, microphones, speech recognition packages, and any other suitable devices or other electronic/software selection methods. The one or more processors 206 may comprise a central processing unit and/or a dedicated controller such as a microcontroller.

The computer-readable memory 208 may be any computer-readable media which may store an operating system 210 and one or more applications 212. The operating system 210 and applications 212 may be comprised of software components. In general, a software component is a set of computer-executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes at least computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Communication media may embody computer readable instructions, data structures, program modules, or other data in a modulated data signal, such as a carrier wave, or other transmission mechanisms. As defined herein, computer storage media does not include communication media.

The mobile device 104 may also include a rendering engine 213 and other device hardware 214. The rendering engine 213 may provide desirable "tuning" of the streaming content, for example by up-cycling the stream or downgrading image quality, to achieve or maintain a smoother user experience. The device hardware 214 may include other hardware that is typically located in a mobile telecommunication device. For example, the device hardware 214 may include signal converters, antennas, hardware decoders and encoders, graphic processors, a Universal Integrated Circuit Card (UICC) slot (e.g., SIM slot), I/O devices, and/or the like that enable the mobile device 104 to execute applications and provide telecommunication and data communication functions.

The mobile device 104 may have a wide range of means of information collection. Visual media capture may be in the form of one or more cameras capable of capturing still images and/or video. Audio media capture may be in the form of one or more microphones or transducers. Non-multimedia sensors include without limitation proximity sensors (an example of which may determine a proximity of the computing device 104 to a surface such as a user's head), GPS sensors, ambient light sensors, one or more accelerometers, a compass, one or more gyroscopes, and backlight illuminated sensors.

A server is any computing device that may participate in a network and host a service accessible by client computers 104. The network may be, without limitation, a local area network ("LAN"), a virtual private network ("VPN"), a cellular network, or the Internet. A server such as the EIT server 126 may be analogous to the mobile device 104 in many respects. Specifically, it may have one or more of a communication interface 202', a user interface 204', one or more processors 206', a computer-readable memory 208', an operating system 210', one or more applications 212', and device hardware 214'.

The multimedia services 130a and 130b may be hosted on a cloud network 216, here corresponding to the network(s) 118 illustrated in FIG. 1. The multimedia services 130a and 130b may provide the services of a multimedia server. Such a server may either be a physical dedicated server or a virtual machine. In the latter case, the cloud 216 may represent a plurality of disaggregated servers which provide virtual application server functionality and virtual storage/database functionality. The disaggregated servers that provide the multimedia services 130a and 130b may incorporate physical computer servers, which may have components, features, and variations that are substantially analogous to those described for the EIT server 126, with access to multimedia content stored in, e.g., multimedia data stores 132a and 132b.

Cloud services may be made accessible via an integrated cloud infrastructure 218. The cloud infrastructure 218 not only provides access to cloud services, but also to other services that may include but are not limited to billing services and other monetization services. The cloud infrastructure 218 may provide additional service abstractions such as Platform as a Service ("PaaS"), Infrastructure as a Service ("IaaS"), and Software as a Service ("SaaS"), to name three.

Figure 3:
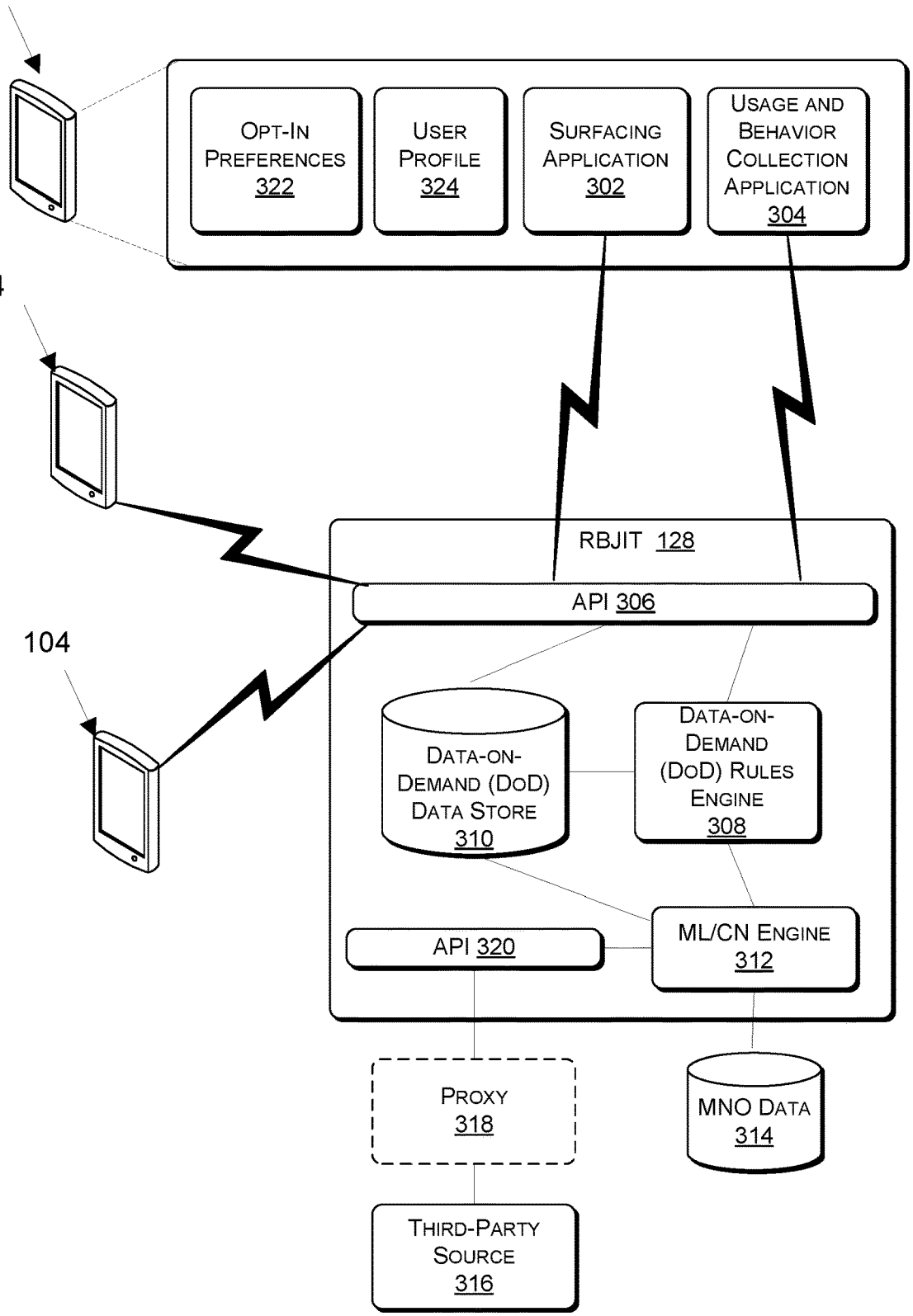
FIG. 3 illustrates an example of an architecture diagram in the context of a mobile platform for rules-based just-in-time multimedia content servicing and for mobile application management.

FIG. 3 illustrates an example of an architecture diagram in the context of a mobile platform for RBJIT multimedia content and for mobile application management. In the example shown in FIG. 3, the mobile device 104 collects usage and behavior information for the user 102 and provides the same for the MNO by way of the RBJIT 128. An opt-in policy may be employed to permit the individual user 102 to choose whether to allow their usage and behavior information to be collected. For example, the mobile device 104, via a setting in an application, may select certain kinds of information (e.g., geolocation, photo metadata, contacts) present on the mobile device 104 or certain behavior (e.g., content accessed, time spent viewing certain content, ads, or websites) that may be collected by the RBJIT 128. Items available for opt-in (or opt-out, to select information or behavior not to be collected) may be made available in accordance with terms and conditions enforced by an agreement with the MNO and/or other entity controlling the collection of data from the usage and behavior collection application discussed elsewhere herein. Opt-in and opt-out status for various items made by the user 102 may subsequently become a part of the user's profile stored on the mobile device 104.

In some embodiments, the user 102 may be associated with various groups of users. For example, the user 102 may be part of a family plan associated with a unique identifier that may be provided by the MNO. In another example, the user 102 may be associated with one or more social network communities, also associated with a unique identifier. The RBJIT 128 also may impose its own groupings of users such as by a demographic and/or a geolocation of the users, in accordance with pre-established rules. In some embodiments, usage and behavior data of associated users may be aggregated by the RBJIT for analysis in addition to analysis of an individual user's information. Indeed, the fact of user devices 104 being used for voice conversations, social media chats, social media postings over mutual or related topics, etc. at given times can be leveraged to provide an additional basis for grouping by the RBJIT 128. In any of these cases, the collected usage and behavior information may be aggregated by user, by group, or by any desired parameter set up for measurement and/or analysis.

The applications 212 may include a surfacing application 302 and a usage and behavior collection application 304. The surfacing application 302 may provide multimedia content surfaced by the RBJIT 128 to the user interface 204 via the rendering engine 213 for a user 102 to view and to select for rendering via the user interface 204. The usage and behavior collection application 304 may operate to monitor selections by and content consumption preferences 322 of the user 102 (optionally per user opt-in or opt-out). This collection of content consumption information is called usage data. The multimedia content surfaced by the surfacing application 302 is determined by the RBJIT 128 based at least on the monitoring by the usage and behavior collection application 304. In some embodiments, the usage and behavior collection application 304 may be part of the surfacing application 302.

The usage and behavior collection application 304 may collect user activity information with respect to other applications 212 on the mobile device 104 (optionally per user opt-in). The usage and behavior collection application 304 may correlate that activity with multimedia content selections by the user 102 on the mobile device 104. These correlations are called behavior data. In this way, the usage and behavior collection application 304 may collect both usage and behavior data.

Content surfaced by the RBJIT 128 may be in the form of cards or tiles as the basic unit of the user experience. An individual card may comprise static content (such as an advertisement, offer, or call to action (e.g., to install or update software, purchase tickets within the app flow, or link to an MNO or other application where a transaction can be completed)), dynamic content (such as a movie trailer or program preview), or a combination of both static and dynamic content, together with metadata including but not limited to name, tagline, description, or URL. Content can be so-called first-party content sourced by the MNO (e.g., by way of example and without limitation limited-time marketing content such as product or service offers, group-related content, announcements, information on events local to the user, partner information and other relationships such as corporate sponsorships, and/or billing information such as due dates and payment options.) or from third-party sources Content may be tagged for retrieval based on category, for example, and/or on other pieces of information such as keywords, parental control rating, etc., including information commonly used for tagging content. Cards may be presented in different orders at different times or for different users 102 as determined, at least in part, using artificial intelligence and the user's self-evolving profile. For example, the RBJIT 128 may process usage and behavior data for the user 102 or multiple users, including one or more groups of users that include the user 102.

The surfacing application 302 and the usage and behavior collection application 304 may both interface with the RBJIT 128 via an RBJIT application programming interface (API) 306, which supports multi-threading. The usage and behavior collection application 304 may collect usage and behavior data for the user 102 and send the same to the RBJIT 128 via the API 306, for example. The RBJIT 128 may send, to the surfacing application 302, surfacing content recommendations and multimedia content for precaching in a cache 220 on the mobile device 104. In some cases, the surfacing application 302 may notify the RBJIT 128 of preference and profile information, such as opt-in status, via the API 306.

The RBJIT 128 itself may comprise multiple software components. A data-on-demand (DoD) rules engine 308 reviews data stored in a data-on-demand (DoD) data store 310. The DoD data store 310 may contain both rules and the collected usage and behavioral data from the various users. A machine learning and/or cognitive network/cognitive computing (ML/CN) engine 312, in concert with the DoD rules engine 308, develops data models from the usage and behavior data in the DoD data store 310 to make predictions of content of interest for the user 102.

As mentioned, the mobile device 104 may have relatively fewer computing processing resources and less computer-readable memory than large-form-factor devices due to its size. Accordingly, caching strategies that might be used by a set-top box or personal computer may not be practical on the mobile device 104. Moreover, due to limited power and limited processing, content preprocessing strategies that might be used by a set-top box or personal computer may also not be practical on the mobile device 104.

Network bandwidth is another constraint. As the user 102 and the user's mobile device 104 move from one location to another, the network connection transfers from one antenna to another (e.g., from an antenna 110a to an antenna 110b). Accordingly, bandwidth is limited by what is available from antenna to antenna. For example, if the antenna 110a has a relatively low number of users and the antenna 110b is servicing a large number of users, then the second antenna 110b may have less bandwidth available and the user 102 may suffer inconsistent bandwidth as the user 102 changes from the first antenna 110a to the second antenna 110b. The result for a multimedia consumer is an inconsistent user experience.

In at least some embodiments, data models developed by the ML/CN engine 312 and the DoD rules engine 308 enforce limited payload response so as to only return data (multimedia content) which is required to be shown in the user interface 204. Multimedia content to be shown should be loaded only after the user 102 clicks/touches on a media tile or card. In some embodiments, multiple cards may be displayed via the user interface 204 in scrollable fashion, such as a scrollable column or list of cards bearing content and/or links to content. The list may be essentially "infinitely" scrollable (i.e., in the sense of a practically endless list of voluminous content or a loop of finite content). As such, only multimedia content (including cards) that can be shown on the user interface 204 should be downloaded to precache in such embodiments, with the rest of the list content being downloadable as the user 102 scrolls up or down (i.e., on demand).

The API 306 responds to requests for multimedia content by the user 102 via the mobile device 104 in accordance with constraints of the mobile device 104 and may thus return content in the appropriate media format and media resolution. Also, regarding the mobile device 104 constraints, the surfacing application 302 may continuously monitor battery usage, resource availability, network speed, and connection quality, for example, such that requests for multimedia content, consistent with the continuously developed data, cause the API 306 to return the appropriate multimedia content as requested by the surfacing application 302.

Rules enforced by the DoD rules engine 308 generally support business purposes that influence and are carried out by the rules engine in the overall surfacing of content. Thus, for example, cards surfaced for offers and marketing campaigns may be time-limited, defined by start and end date/time. The number of customers and specific customers, customer segments, or customer groups who are presented or may redeem the offer may be set by rule. In some embodiments, the frequency of a campaign, or the frequency of offerings within a campaign, may be capped. These are but a few of countless options that may be set by rule and by which a card or cards are ultimately surfaced.

The ML/CN engine 312 is not limited to analyzing data stored in the DoD data store 310 and also may have access to MNO data 314 and data from one or more third-party sources 316. In some embodiments, data from a third-party source 316 may be accessed via a proxy 318. The proxy 318 provides security by isolating the third-party source 316 from the RBJIT 128. In some embodiments, the MNO may control the proxy 318, provide needed proxy information to the third-party source 316, and route traffic according to mappings that may be provided by the third-party service 316. In one or more embodiments, an API layer 320 may be built to provide right-fitting of content (e.g., bandwidth considerations) and/or a secure endpoint for access by the third-party source 316.

The MNO data 314 may include information such as billing information to determine what purchases have been made by the user 102, as well as identification of friends and family. For example, the MNO may maintain an MNO family group or billing group identifier. In some cases, the MNO identifier, such as T-Mobile US's T-Mobile ID™, may track not only mobile devices 104 that have subscriber identification module (SIM) cards but also Wi-Fi-only devices. In some embodiments, a Wi-Fi-only device may also have a surfacing application 302 and a usage behavior and collection application 304 configured to interface with the RBJIT 128. In this way, more comprehensive usage and behavior information may be collected (subject to applicable terms and conditions of the user agreement with the MNO, especially as concerns collection of personally identifiable information), thereby improving the quality of the user data in the DoD data store 310. The system may continually develop/implement an algorithm using machine learning techniques to apply the usage and behavior information to the multimedia content based on user engagements and additional input from customer data provided by MNO to improve, e.g., surfaced recommendations (supporting A/B testing related to both new and existing content in at least some embodiments). Recommendations are not limited to recommendations for individual content (e.g., a movie, a restaurant, etc.) but may include recommendations of multiple content mixes (dinner and a show, movies of a particular genre) to identify the most engaging content mix for an individual user 102 or specific user segments or user groups.

The MNO data 314 may also include demographic and profile information of various users 104. The MNO data 314 may be static, semi-static, or dynamic. In some embodiments, the user device 104 collects activity information on a substantially real-time basis. For example, the user device 104 may transmit geolocation information based on its GPS sensors. This geolocation data may be accessed as part of the MNO data 314. In this way, data from the user 102 may be aggregated with data of sets of users as defined by the ML/CN component 312 and the DoD rules engine 308 using this demographic and profile information. Many other types of MNO data 314 may be collected in real-time—content consumed, number of clicks on a particular tile or CTA, etc. may all have real-time value and be used to dynamically update data as needed. Additionally or alternatively, data may be collected and/or updated periodically or according to a schedule.

The RBJIT 128 may also receive usage and behavior data collected from one or more third-party sources. The third-party sources may include the one or more third-party sources 316 and therefore may include data from the multimedia services 132a and 132b generally accessible via their application programming interfaces. Data from third-party sources may include social network information via their respective application programming interfaces. In this way, usage and behavior data accessible from the third-party sources may supplement user data in the DoD data store 310, and data from a user 102 may be aggregated with sets of users as defined by the ML/CN component 312 and the DoD rules engine 308 using the third-party services and social network data.

With the ML/CN engine 312, the RBJIT 128 makes use of machine learning/cognitive network techniques to predict multimedia content that the user is likely to consume. In some embodiments, the DoD rules engine 308 makes predictions of multimedia content that may be of interest to the user 102. These predictions not only are used to surface content suggestions, but also to determine how much multimedia content (e.g., how much data) to download for precaching in the cache 220 (in full or in part) with high quality/high resolution/high fidelity data. In this way, if a user 102 selects a specific multimedia content file, the user 102 may readily experience on the mobile device 104 a high quality/high resolution/high fidelity version of the multimedia content from its cache 220. The size of the file precached may be determined based on one or more factors such as the speed to download the (un-precached) remainder of the multimedia content not yet received by the mobile device 104. Accordingly, as the user device 104 outputs the precached content, the rest of the content may be downloaded from the network and RBJIT 128.

The operation of the RBJIT 128 starts with the user 102 and the user device 104. The user device 104 may designate portions of the memory 208 as the cache 220 and a cache 221. In some embodiments, the cache 221 is a persistent cache. The caches 220 and/or 221 may be stored in a user partition. The persistent cache 221 stores the profile of a user and usage/behavior data collected by the usage and behavior collection application 304. The respective sizes of the caches 220 and 221 are optional and should be managed to meet objectives for battery usage optimization and memory optimization considering network performance. As data gathering by the usage and behavior collection application 304 is real-time, the persistent cache 221 need not be flushed frequently; for example, flushing the persistent cache 221 approximately ever two days may be sufficient for most implementations. File size limitation likewise is optional with 5 mb at run time being a useful guide. Caching policy may be set by the user 102.

Because cache is limited, in some embodiments precaching may be restricted to multimedia content indicated by an algorithm, refined or tuned by the ML/CN engine 312 according to real-time usage and behavior data collected from the mobile device 104 as well as a user profile 324, to be likely to be requested, ordered, downloaded, etc. by the user 102. With this in mind, advertisements need not be precached, for example.

The profile of the user may include opt-in and opt-out preferences 322 (as used herein, "opt-in preferences"). The opt-in preferences 322 may relate tog multimedia content and user preferences specific to a multimedia service 130a and 130b and be included in the user profile 324. Furthermore, the user profile 324 may store identifications of social networks of which the user 102 is a member and opt-ins for the MNO to access this information, especially as may concern personally identifiable information. These preferences and identifiers provide additional data and hints about the user that may be used by the ML/CN engine 312 in the just-in-time surfacing of multimedia content.

In some embodiments, the user profile may be edited via application settings of the surfacing application 302 or another application. Whenever the user profile is established or updated, the contents of the persistent cache 221 are also updated, and the user profile is sent to the RBJIT 128 via the API 306 and stored in the DoD data store 310.

In some embodiments, the surfacing application 302 defines a set of software triggers corresponding to various user events. User events may include, without limitation, selection of multimedia content, previewing multimedia content, and viewing a page with multimedia content. The user events may also include stopping and pausing playback of multimedia content. The usage and behavior data are processed by the collection application 304 and stored in the persistent cache 221. For example, the collection application 304 may detect that a user 102 selected a specific multimedia content (file) but stopped playing the file after five minutes and never returned to the file. The usage and behavior collection application 304 may either store the collection of events in the persistent cache 221 or process these events as an indication of that the user 102 is not interested in the file.

In some embodiments, the operating system 210 of the mobile device 104 enables the enlistment of events exposed by other applications 212 as well as events of the operating system 210 itself. Upon detecting an event published by the surfacing application 302, the usage and behavior collection application 304 may also collect events of other applications 212 within a predetermined amount of time of detecting the surfacing application event. The usage and behavior collection application 304 may then associate those events and the sources of those events with the surface application event and store the association in the persistent cache 221. In turn, the ML/CN software component 312 provided with this information may use it to detect behavioral data associated with the surface application event. In this way, the information feeds the determination of content that should be precached and content that should not be precached, increasing the likelihood that content in the precache will be demanded by the user 102 and consequently enhancing the user experience.

The usage and behavior collection application 304 may collect events of other applications 212 and push the same to the RBJIT 128 on demand. Alternatively or additionally, the RBJIT 128 may instruct the usage and behavior collection application 304 to send behavioral data as part of a user request, or from time to time, to improve the ability of the RBJIT 128 to predict what multimedia content is likely to be consumed if surfaced on demand, on the basis of behavior patterns.

In general, the usage and behavior collection application 304 may either push the contents of the persistent cache 221 to the DoD data store 310 either in response to an event on the mobile device 104, or the RBJIT 128 may affirmatively pull the data on demand. An example of the usage and behavior collection application 304 pushing the data in the persistent cache 221 may be to update the DoD data store 310 from time to time. An example of the RBJIT 128 affirmatively pulling data from the usage and behavior collection application 304 is in determining content to precache on the mobile device 104.

The DoD data store 314 may contain information not only about the user 102, but also about other users in some embodiments. The ML/CN engine 312 may aggregate the user data either individually to the user, by a group with which the user 102 is affiliated, or with all users. The group with which the user 102 is affiliated may be static or semi-static (such as by family, billing group, or social network community). In some embodiments, the group with which the user 102 is affiliated may be dynamic, such as a social network community defined by social network community attributes as provided by the third-party (social network data) source 316, or by demographic or geolocation attributes as provided by the MNO data 314.

From time to time, the ML/CN engine 312 may develop one or more data models based on data of the user 102 or one or more user groups. These ML/CN data models comprise adaptive rules for determining multimedia content for surfacing.

Telemetry from the usage and behavior collection application 304 about a current state of the user device 104 is received by the RBJIT 128 and stored in the DoD data store 310 and made available to the DoD rules engine 308. The DoD rules engine 308 also has access to MNO data 314, such as geolocation or other user device data. In addition to forming groups based on geolocation, as mentioned elsewhere in this description, user (device) geolocation enables location-based content to be preferentially surfaced where location-based content is available (i.e., the ability to book tickets at a nearby movie theater or recommendation for a nearby restaurant). The telemetry could also be a usage event with respect to content surfaced by the surfacing application 302, or behavior data transmitted by the usage and behavior collection application 304 from the persistent cache 221. Telemetry measurements may, in some embodiments, be by a unique tracking identifier to measure user engagement with content (e.g., user selections of content and time on content) and/or other content consumption metrics (supporting NB testing related to both new and existing content in at least some embodiments), useful for tailoring recommendations and developing/following pre-caching policy as well as to meet content licensing and financial settlements, for example. Based on this telemetry, the DoD rules engine 308 inputs this data into the one or more ML/CN models which in turn generate a presentation (e.g., in a list) of multimedia content predicted to be of interest to the user 102.

Telemetry may be used to provide reports based on collection data collected by the user behavior and collection application 304. Reporting may be geared to evaluating aspects such as, and without limitation, the effectiveness of the user experience (e.g., do conditions cause an advertisement presented at content startup to load so slowly as to induce the user to move on without waiting for the content), the effectiveness of the content, the value of the service, and monetization metrics, including fill rate, click-through rate, CPM, eCPM, and/or so forth. The user behavior and collection application 304 may provide raw data feeds, click logs, content load time, buffering status, and other user information. Based at least on such information, the reporting engine may provide reports that include but are not limited to user engagements, number of sessions, active views, number of offers, user interactions with a service, various click-related metrics, actions within app, revenue-related metrics, reporting per channel, reporting per offer type, reporting per specific offer, and reporting per action recommended.

The DoD rules engine 308 may then output, to the API 306 for surfacing by the surfacing application 302, one or more of the predicted multimedia content along with statistical measures of confidence. The statistical measures of confidence may be based on user/customer data as mentioned elsewhere herein received from the usage and behavior collection application 304, as well as system data and/or network conditions (e.g., system load times, file size, buffering, bandwidth, and so forth, which may also take into account the kind of content and its buffering requirements) received from the third-party source 316, the data being delivered to the ML/CN engine 312, which may generate the statistical measures, although one or more other components may be provided and implemented alternatively or in combination to this end. The surfaced multimedia content files may be ranked by the ML/CN engine 312 and selected by the surfacing application 302 based on those statistical measures of confidence.

The surfacing process performed by the surfacing application 302 may include one or more of presenting the files comprising the multimedia content to surface (recommended based on the statistical measures of confidence and/or ranking), thumbprints of the files, metadata of the files, and at least a portion of the multimedia content itself. The multimedia content to be surfaced is then affirmatively pushed to the mobile device 104. In this way, the mobile device 104 may surface multimedia content on demand with limited perceivable lag to the user 102 at the quality/resolution/fidelity demanded by the user 102.

The RBJIT 128 enables various use cases. For example, different users 102 may have different degrees of opting in or opting out, such as a user 102 who does not opt in to share usage and behavior data but may still opt to share demographic data. The RBJIT 128 may then associate that user 102 with other users in one or more groups. In some embodiments, the RBJIT 128 may surface multimedia content based on the usage and behavior of other users in that user's social network community, family group, or billing group, to name three examples. In some instances, the ML/CN data models impose a threshold condition according to which the likelihood of a user 102 consuming particular multimedia content is quantified and must meet or exceed a threshold that may be set by the user 102, predetermined by the RBJIT 128, or the result of learning from analysis of the usage and behavior data, or other data, by the DoD rules engine 308 and thus dynamic. In this way, a non-opt-in user may still benefit from this aspect of the RBJIT 128 operation.

Typically, as more and more data are collected, the more the ML/CN data models improve, and the more the accuracy of the RBJIT 128 predictions improves. In some embodiments, over time, the surfacing application 302 may generate new hints and store the same in the persistent cache 221 of the mobile device 104 instead of constantly recalculating predictions. When the persistent cache 221 is updated in this way, these generated new hints will in turn modify the ML/CN data models in accordance with known principles as modified to suit the novel operations disclosed herein. These hints may be edited in accordance with the surfacing application 302 settings. For example, in some embodiments, autogenerated hints may be suppressed, labeled, or edited by the user 102.

To illustrate, consider a scenario in which the RBJIT 128 detects from data received from the usage and behavior collection application 304 that every Sunday night, an NFL football game that was played earlier in the day is watched on the user device 104. Implementing an algorithm, the RBJIT 128 may calculate, based on the received data, the MNO data 314, and/or the data from the third-party source 316, that there is a 95% chance of the game being watched and on the basis of 90% being above a predetermined threshold set in accordance with the description herein, may generate a hint to proactively download the NFL game. The hint may be autogenerated at the same time for each instance or at a time chosen by the user 102. The surfacing application 302 may receive a notification that the RBJIT 128 suggests the hint and upon acceptance by the user 102, adds the hint to the persistent cache 221, which in turn updates the RBJIT 128 and the ML/CN data models.

The user-directed opt-in preferences 322 may be accessible by the user 102 via the user device 104. The user-directed opt-in preferences 322 may, in some examples, provide various fields of information related to the user 102 and her usage of the user device 104, which may be made available for harvesting by the surfacing application 302 and/or the usage and behavior collection application 304. Some examples of suitable fields of information relate to social media accounts and activity, demographics, device usage history, applications stored on the user device 104, and Wi-Fi or data access history. These examples need not all be offered, and others not listed, may.

To indicate preferences, including opt-in or opt-out, the user interface 204 may illustrate check boxes or the like for the user 102 to indicate one or more fields by, e.g., selecting the appropriate check boxes. In embodiments wherein the check boxes represent user permission for an app to access (or not access) data or device components, the requesting app is made capable (or incapable) of accessing and leveraging such data or device components. Other techniques for permitting user opt-in or opt-out may also be employed In some embodiments, the user 102 is interested in downloading content for consumption via the user device 104 as described herein, In such embodiments, opt-ins selected by the user 102 may be leveraged by the user device 104 and, in particular, by the surfacing application 302 and the usage and behavior collection application 304 not only collect data and use it to determine content to surface, but also to determine content to precache to enhance the user experience by, for example, placing the content on the user device 304 so that it is more readily and quickly accessible by the user 102, whether in the form of a card or streaming content or any other form, as described elsewhere herein. Information from fields relevant to these functions may be presented to the user 102 and, based on her selections, may be used for precaching and/or surfacing decisions without any additional action by the user 102. This permits the user 102 to benefit from the enhancements afforded by the RBJIT 128 without requiring knowledge of the rules-based decision making happening in the background. What the user experiences is a rapid response to content selections and an ability to make choices more quickly than if the RBJIT 128 were unable to learn from the user's preferences, opt-ins, and usage history.

Likewise, when the user 102 deactivates a particular field by, e.g., clearing the related check box, then information from this field may not be used for precaching and/or surfacing decisions in similar embodiments. In this manner, the user 102 may freely browse and select (or de-select) particular fields of information as desired to either include or restrict applications or external actors from precaching and/or surfacing on the user device 104. The selections made by the user 102 in the user-directed opt-in preferences 322 may subsequently become a part of their profile.

In various embodiments, the fields of information may each include one or more subfields. For example, and without limitation, a social media field may include one or more subfields for different social media platforms. Upon opt-in (or in the absence of opt-out), the user 102 effectively gives permission to the usage and behavior collection application 304 to collect information related to user behavior with respect to any of these platforms. Such information may include, but is not limited to, groups belonged to which the user belongs, pages followed, discussion topics participated in, and/or interactions with identifiable users. Likewise, selection of a demographics field may permit access to such personal information as age, gender, and/or salary, to name three. Other examples may include a device usage history field having subfields for calls, texts, and/or locations. Information collected may include metadata such as time and duration related to calls and/or texts, in addition to detailed content information such as full text and/or speech related to calls and/or texts. The locations subfield may relate to the user's location history (such as cities, states, and/or countries traveled to), in addition to detailed location history information such as malls, stores, neighborhoods, or even other individuals traveled to and/or associated with. Such data utilized beneficially may enable the RBJIT 128 to preferentially surface information relevant to the user's present location or predicted future location. For example, a user who frequents a particular part of a city may receive, on the user device 104, precached thumbnail videos relating to nearby events, together with a call to action button to go directly to a ticket purchasing site upon selection. Advertisements for local establishments or services frequently used by residents of identified locations may be targeted to the user 102 in a similar way. For example, an advertisement to book a rental car may be presented upon recognizing that the user 102 is at an airport or hotel.

In some embodiments, because the user 102 may be willing to receive advertisements or suggests of these types for certain subject matter but not others, the opt-in preferences 322 may include categories by which the user 102 may opt-in or out on that basis. For example, events may be categorized as "sporting" events or "music" events, which may in turn be broken down into "arena" events or "club" events. In such embodiments, the user 102 may be interested in sporting events and clubs, and thus opt-in to receiving such content and/or advertisements.

Numerous fields may be defined for categorizing information, any or all of which may be presented to the user 102 for opt-in or opt-out. Further, the user 102 may revisit and edit user-directed opt-in preferences 322 at any time in some embodiments, giving the user 102 non-negligible control over use of her information, whether sensitive or not, which in turn gives the user significant control over the ultimate results of content selection, precaching policy, and update policies for apps individually or collectively. In this way, the user 102 may continually tailor her user profile 324 to enhance her user experience.

In order that the user 102 is aware of the options for opting in and/or out, and further to enforce user preferences as described herein, terms and conditions (or terms of service) are provided for the user 102 to accept. In some instances, nonacceptance by the user 102 results in the inability to use and/or take advantage of apps and services described herein, including but not limited to services that enhance user experience in accordance with the collection and use of usage and behavior data such as precaching, providing data on demand, and pushed software updates. These terms and conditions may be provided by the MNO via the RBJIT 128 or otherwise (for example, by individual apps on the user device 104). Further, individual types of information, such as those associated with fields in embodiments that utilize fields, may be subject to opt-in or opt-out. In some embodiments, the user preferences are maintained in whole or in part in the user profile 324. However, no limitation is intended or should be inferred.

Actual opt-in language will be tailored to the context. For example, terms and conditions may be provided at app installation, device setup or registration, device activation, or service initiation, and/or may be presented at intervals to provide an opportunity for the user to update preferences or to comply with applicable regulations, or if the user 102 initially declines. The terms and conditions may be presented in their entirety upon any of these events, or may be accessible by a link provided in their stead. The terms and conditions may include a privacy policy or a link thereto.

Figure 4:
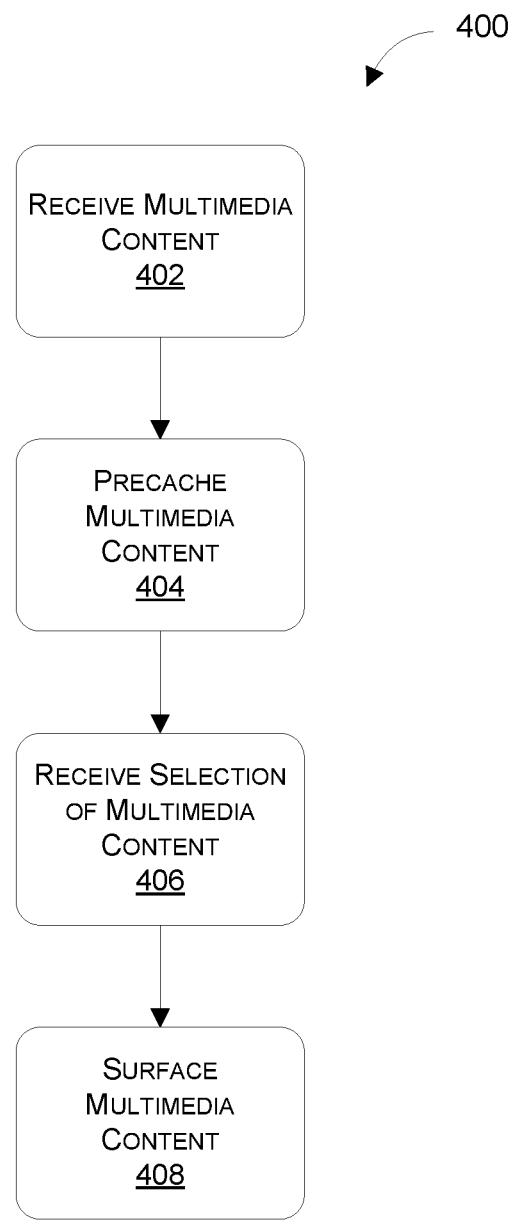
FIG. 4 is a flow diagram of an example process performed at least in part by the mobile device for surfacing multimedia content.
Figure 5:
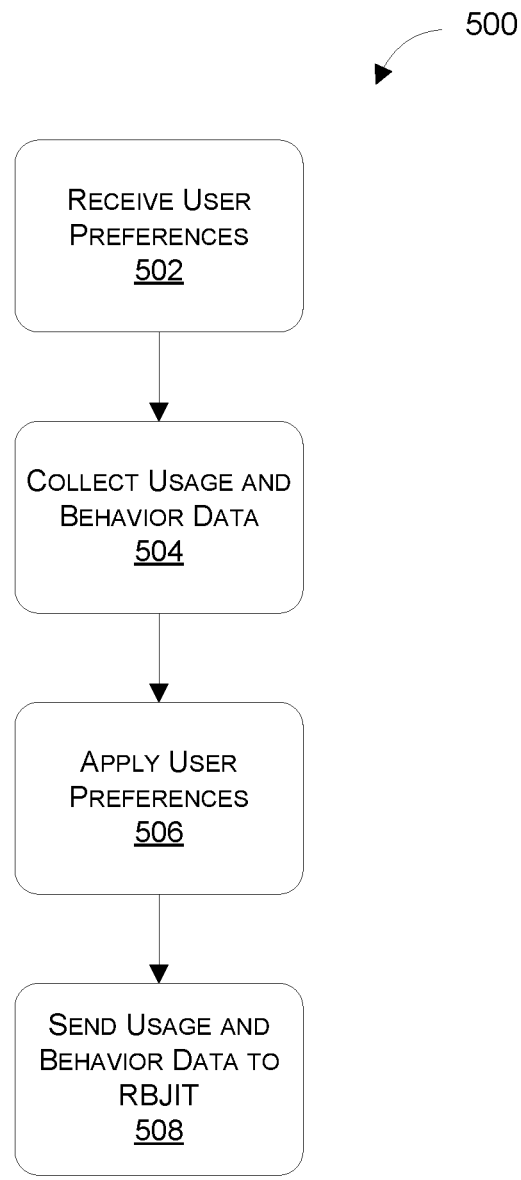
FIG. 5 is a flow diagram of an example process performed at least in part by the mobile device for collecting usage and behavior data of the user.
Figure 6:
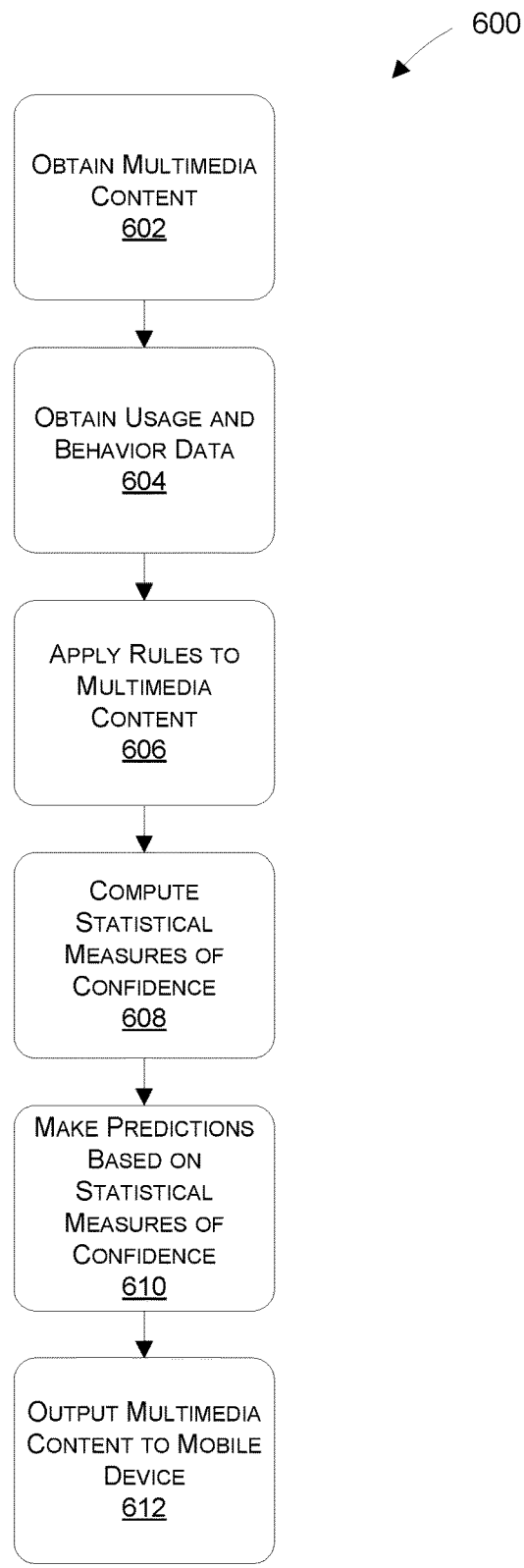
FIG. 6 is a flow diagram of an example process performed at least in part by a rules-based just-in-time engine for determining multimedia content for sending to the mobile device.

FIGS. 4-6 present illustrative processes for implementing mobile device rules-based just-in-time servicing. The processes are illustrated respectively as a collection of blocks in logical flow charts, which represent sequences of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the network architecture 100 of FIG. 1.

FIG. 4 is a flow diagram of an example process 400 performed at least in part by the mobile device 104 for surfacing multimedia content. At Block 402, the mobile device 104 receives multimedia content from the RBJIT 128. Multimedia content may be provided by the MNO or by third-party sources and may be static or dynamic. The multimedia content may include, without limitation, short form video content, linear TV content, movie trailers, music videos, news articles, news clips, photo gallery carousels, app recommendations, offers, or direct commerce.

At Block 404, the mobile device 104 precaches the multimedia content received in Block 402 in the cache 220. The cache 220 is sized to store an amount of multimedia content that may be presented via the user interface 204 on demand by the user, for example in scrollable fashion, such as a scrollable column or list of cards bearing content and/or links to content. Start and end dates/times in the cache 220 may be established for the multimedia content to allow windowing of events (e.g., offers, movie trailers, etc.) and auto-removal from the cache 220 once expired.

At Block 406, the mobile device 104 receives, for example via the user interface 204, a selection by the user 102 that enable certain actions including the presentation of multimedia content on the user interface 104. Such multimedia content may be present at least in part in the cache 220 for ready and speedy retrieval and presentation.

At Block 408, the mobile device 104 surfaces the multimedia content via the user interface 204. The multimedia content is surfaced by the surfacing application 302 from the cache 220 in portions sufficient to maintain a high-quality user experience due to the relative speed of caching technology and policy, as well as the proximity of the cache 220 (i.e., being in the mobile device 104 itself).

FIG. 5 is a flow diagram of an example process 500 performed at least in part by the mobile device 104 for collecting usage and behavior data of the user 102. At Block 502, the mobile device 104 receives user preferences from the user 102, for example via user input to the user interface 204. The user preferences may include, without limitation, how much content to cache in the persistent cache 221, how long for the content to be cached, whether the user opts to allow collection of certain information (or of all information) related to usage and behavior while using the mobile device 104, selection and content consumption history, identifications of social networks of which the user 102 is a member, and/or so forth. In some embodiments, the user preferences manage what data may or may not be collected by the usage and behavior application 304 or manage what data the usage and behavior application 304 may provide to the RBJIT 128. In some embodiments, the preferences may be set individually for different applications (e.g., one application may be permitted to collect location information while another application may not). Some settings may be set by the user as preferences for some applications but not for all (e.g., the user may be able to deny permission for one application to access contacts whereas but unable to deny the same permission to another application).

At Block 504, the usage and behavior collection application 304 collects usage and behavior data of the user 102 under control of the one or more processors 206. The usage and behavior data may be collected on a real-time basis and may include, without limitation, demographic and profile information (static, semi-static, or dynamic) such as geolocation information, content consumed, number of clicks on a particular tile or CTA, and other activity information. In addition to collecting new data, the usage and behavior collection application 304 may collect dynamically updated data. Additionally, or alternatively, data may be collected and/or updated periodically or according to a schedule.

At Block 506, the mobile device 104 may apply the user preferences to manage the information collected by the usage and behavior collection application 304 and/or provided to the RBJIT 128 by the usage and behavior collection application 304. The user preferences may be applied by the usage and behavior collection application 304 or by separate hardware or software within the mobile device 104, under control of the one or more processors 206.

At Block 508, the mobile device 104 may send the usage and behavior data to the RBJIT 128. The usage and behavior data may be sent by the usage and behavior collection application 128 or by another application under the control of the one or more processors 206.

FIG. 6 is a flow diagram of an example process 600 performed at least in part by the RBJIT 128 for determining multimedia content for sending to the mobile device 104. At Block 602, the RBJIT 128 may obtain multimedia content from the data-on-demand data store 310 or from the one or more third-party sources 316 in response to a request received from the mobile device 104 (e.g., from the surfacing application 302). Multimedia content obtained from the one or more third-party sources 316 may be obtained via the proxy 318.

At Block 604, the RBJIT 128 obtains usage and behavior data from the mobile device 104 (e.g., from the usage and behavior collection application 304). The usage and behavior data may be obtained in whole or in part in real time. Usage and behavior data may be obtained from the one or more third-party sources 316 as well. The usage and behavior data may be data of the user 102 or, additionally or alternatively, from multiple users of one or more groups of users to which the user 102 belongs. Additionally or alternatively, usage and behavior data, such as the usage and behavior data obtained from the one or more third-party sources 316, may be data of multiple users to be considered in addition to the data of the user 102.

At Block 606, the RBJIT 128 applies rules to the multimedia content for computing statistical measures of confidence that the user 102 will be interested in the content if surfaced to the mobile device 104. The rules are obtained from the DoD rules engine 308, for example, applied according to an algorithm. The ML/CN engine 312 may apply machine learning to results of prior content consumption by the user 102 or multiple users as outlined elsewhere herein to refine the rules to be applied by the DoD rules engine 308.

At Block 608, the RBJIT 128 computes statistical measures of confidence that the multimedia content considered for surfacing will be of interest to the user 102. The statistical measures of confidence may be based on user/customer data as well as system data and/or network conditions as described herein, the data being delivered to the ML/CN engine 312, which may generate the statistical measures, although one or more other components may be provided and implemented alternatively or in combination to this end.

At Block 610, the RBJIT 128 makes predictions based on the statistical measures of confidence computed at Block 608. In some embodiments, the DoD rules engine 308 makes use of machine learning/cognitive network techniques of the ML/CN engine 312 to predict multimedia content that the user is likely to consume. These predictions may also be used to determine how much multimedia content (e.g., how much data) to download for precaching in the cache 220.

At Block 612, the RBJIT 128 outputs multimedia content to the mobile device 104. In some embodiments, the mobile device 104 may pull the multimedia content and/or the RBJIT 128 may push the content. In some embodiments, the multimedia content is output before being requested by the user 102, in portions set for the size of the cache 220 so that the user 102 may be presented with the multimedia content on demand from the cache 220 when requested. How much to precache in this way, as well as the content itself, is determined using the techniques described herein.

The usage and behavioral data utilized in one or more of the disclosed embodiments may be sensitive. In some embodiments, access to the usage and behavioral data is controlled in accordance with permissions. Additionally, the surfacing application 302 and the usage and behavior collection application 304 manage flow of data, including that of large multimedia content files. Accordingly, the MNO may have management and versioning challenges, as well as network bandwidth management challenges.

In light of these challenges, the surfacing application 302 has the ability in some embodiments to manage downloads of multimedia content files recommended by the RBJIT 128. Multimedia content downloads are potentially quite large. Since the RBJIT 128 exercises aspects of a server, the RBJIT 128 may respond to download requests from the surfacing application 302. From time to time, the RBJIT 128 may not be able to respond to the surfacing application 302, for example due to a high volume of requests. In general, applications that do not receive a response from a server may poll the server again. For the RBJIT 128, however, this is counterproductive. Therefore, in some embodiments, the surfacing application 302 and the usage and behavior collection application 304 may be configured not to re-poll the RBJIT 128 for a predetermined amount of time that may be set to increase with each failed connectivity attempt in some embodiments. This technique is called "retry and backoff" (RAB) since the surfacing application 302 and the usage and behavior collection application 304 are backing off from contacting the RBJIT 128 with each failed retry.

Figure 7:
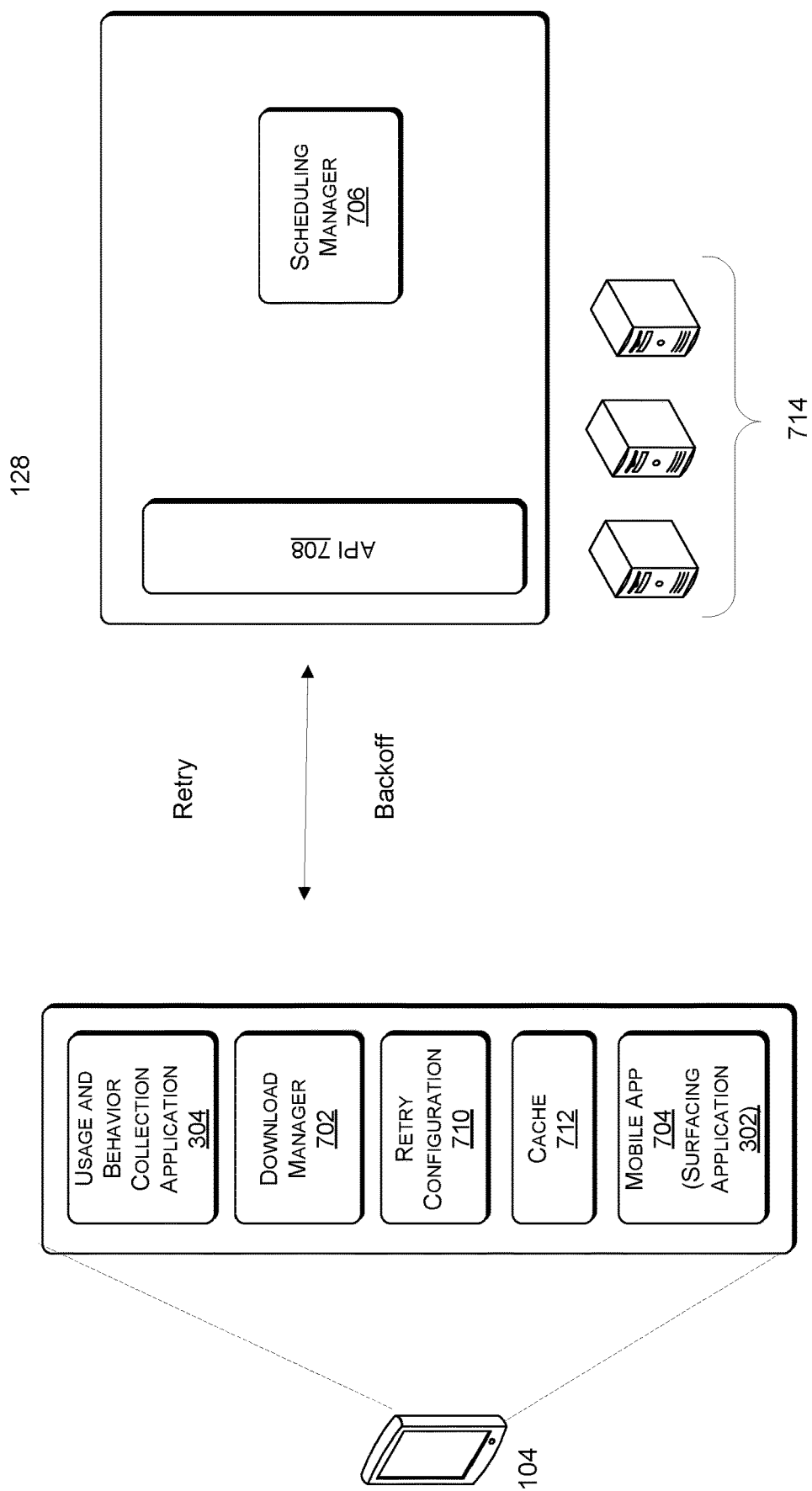
FIG. 7 illustrates an example of an RAB scheme that may be implemented in a system for mobile application management.

FIG. 7 illustrates an example of an RAB scheme that may be implemented in a system for mobile application management. In some embodiments, the scheme illustrated in FIG. 7 may be implemented in the context of a mobile platform for rules-based just-in-time multimedia content servicing and for mobile application management as shown in FIG. 3 and described elsewhere herein.

In the example shown in FIG. 7, a download manager 702 in the mobile device 104 comprises hardware, software, or a combination of hardware and software. For example, the download manager 702 may include one or more non-transitory computer-readable media having executable instructions that, if executed by the one or more processors 206, cause the processor(s) 206 to perform operations to communicate with the RBJIT 128 on behalf of the mobile device 104 and, in particular, on behalf of a mobile application 704 (such as the surfacing application 302). In some embodiments, the download manager 702 communicates with a scheduling manager 706 stored on the EIT server 126 and accessed via an API 708. The scheduling manager 706 may be configured of hardware, software, or a combination of hardware and software. For example, the scheduling manager may include one or more non-transitory computer-readable media having executable instructions that, if executed on the one or more processors 206', cause the processor(s) 206' to perform operations to monitor load on the RBJIT 128 (including monitoring the capacity of the RBJIT 128 to handle download requests) and to provide information used by the download manager 702 to manage one or more scheduling functions managed, including but not limited to a retry configuration 710 stored in the memory 208 on the mobile device 104 by which the download manager 702 on the mobile device 104 performs RAB. In some examples, the information provided by the scheduling manager includes feedback to the download manager 702 and/or direction to change, e.g., override, certain settings in of the retry configuration. The settings may be changed for a set period of time or until reset by the download manager 702 at its own initiative or by user input. In some embodiments, the settings may include a longer or shorter delay determined by the scheduling manager based on a machine learning algorithm as discussed more fully below.

In some scenarios, the scheduling manager 706 might make a request to spawn virtual machines with more download servers to address an overload. However, in the case of content servicing, content servers take time to instantiate. Thus, in some embodiments, the scheduling manager 706 may include a notification along with a "server not available" message. Upon receipt, the download manager 702 may select a more rapidly increasing download function. However, in some examples, the scheduling manager 706 may nevertheless request no further retries for a time specified by the scheduling manager 706 in accordance with a pre-established rule governing the scheduling manager 706. The rule may specify a predetermined time enforced by the scheduling manager 706, or the time may be set based on present circumstances based at least on input from a machine learning algorithm. In the latter case, the machine learning algorithm may learn on data of prior heavy-demand downloads to put forth an optimal timeout period.

In some embodiments, RAB is a scheduling function to prevent the overloading of download servers such as the RBJIT 128. Client devices, such as the mobile device 104, may seek software system updates, updates of applications, content or other downloadable assets, or be made aware of their availability. In cases of updates, client devices frequently receive notification from the RBJIT 128, a play store, or from the mobile app itself that a download is available. Commonly, all client devices having the same mobile app 704 receive the notifications at the same time, and as a result a large number will attempt to access the download servers at substantially the same time. If the download server infrastructure is not sufficient to handle the simultaneous demands of the client devices, the download server infrastructure may crash, which is inconvenient to the user, ties up device resources, and may lead to a corresponding pause or failure of the application of concern due to likely temporary API errors.

On receiving a response from the API 708 to the situation (e.g., server not available), the mobile app 704 may continue to retry for the update or content (and backoff in case of failure) indefinitely or until expiration of a time period or number of retries preset in the mobile device 104 or RBJIT 128, inhibiting resolution of the congestion. In some embodiments, a retry configuration is set by the scheduling manager 706 of the RBJIT 128 and enforced by the download manager 702 of the mobile device 104. The retry configuration may be stored on the mobile device 104 in device memory 208 or in a refreshable cache 710, and may be pulled to cache for refresh as described elsewhere herein. The retry configuration may be retrieved from its location as needed, for example during RAB and/or as part of a mobile app version check.

In some embodiments, because the mobile app 704 attempts the download according to the policy set in the retry configuration, there is no default retry configuration. If no retry configuration is available, then a retryable:false parameter is forced on the download manager 702 even if a retryable:true is returned in an API response to a failed download request.

To the extent that the surfacing application 302 is able to either precache or download the multimedia content, the user 102 will not see a degradation in the quality of viewed multimedia content. In this way, the RBJIT 128 is protected from being overwhelmed by retry requests.

In various embodiments, the retry configuration may employ different re-polling behavior depending on the given scenario. For example, the retry configuration may specify that the download manager 702 wait a predetermined amount of time (e.g. predetermined backoff time) before re-polling the RBJIT 128 after a failed download attempt. In some examples, the backoff time (intervals between retries) may increase, decrease, or remain the same in accordance with a retry configuration set by the scheduling manager 706 of the RBJIT 128 and enforced by the download manager 702 of the mobile device 104. In some embodiments, the intervals between successive retries may increase linearly (e.g., increase by the same addend); in other embodiments, the intervals may increase nonlinearly (e.g., increase exponentially or by predetermined increments) in accordance with the retry configuration, potentially avoiding the need to obtain an entirely new release of the mobile app 704 by, e.g., a visit to an app store. For example, and without limitation, subsequent intervals may increase by a multiplier, exponentially, or by another algorithm suited for the purpose. In embodiments where the predetermined retry interval increases between subsequent re-polling attempts, the amount of increase may be statically determined based on a fixed scheme (e.g., fixed multiplier or algorithm), or may be dynamically determined based on a subscription policy, which may take into account a usage plan (e.g., subscription tier), a measurable parameter such as network congestion, signal quality at the mobile device 104, and/or a condition underlying the download such as exigency of the update/content. For example, an urgent security patch may be given a more slowly increasing interval rate retry scheduling function, such as a linear function with a small addend, whereas a content download might have a steeply increasing function. In some examples, different functions may be imposed by the MNO for different subscriber tiers; a more expensive tier may receive priority response (i.e., more slowly increasing intervals) as compared with a less expensive tier, which might receive an exponential function. A function may also be determined by the user. For example, the user may prioritize a frequently used mobile app 704 by setting a more slowly increasing function. In such instances, the scheduling manager 706 may make the retry configuration or components thereof lockable features, whereby a user may pay for greater control or a subscriber tier may offer greater control, unlockable in each case by the scheduling manager 706 in accordance with corresponding permissions. Thus, each mobile device 104 in communication with the RBJIT 128 may employ a different retry configuration with the goal of reducing failed attempts. It will be appreciated that various RAB policies or retry configurations may be employed without departing from the spirit and scope of the invention.

In one example, a field may be added to the API response (e.g., "retry_config") of "/config" to provide the retry configuration. An example API response setting or managing the retry configuration may proceed as follows. In this example, "random" is a function which generates a random number between 0 and a maximum value. A reasonable value should be chosen suitable for the use case (here, an interactive app:

```
{"retry_config ": {
   "random":"100",
   "interval": [
      {"attempt": "500"},
      {"attempt": "1000"},
      {"attempt": "5000"}
   ]
}}
```

In this example, in the event of a failed download attempt and retryable:true is returned, then, the first retry interval (backoff period) is 600 ms (100 ms+500 ms), the second interval is increased by 1000 ms (600 ms+1000 ms=1600 ms), and the third interval is increased by 5000 ms (1600 ms+5000 ms=6600 ms). After three retry attempts by the download manager 702, retryable:false is returned and no further requests are sent. In addition, a retryable:false response may be returned under certain conditions set in the configuration (e.g., a set number of retries has been reached, a set time period for retries has been reached, the server has crashed, etc.). In such a case, no further requests are sent.

In various embodiments, the provisioning of the retry configuration itself may be carried out using different techniques depending on the given scenario. For example, in one embodiment, the retry configuration may be provisioned externally to the mobile app 704 in order to allow the configuration to be changed without requiring an update to the mobile app 704. In one instance of external provisioning, it may be desirable for the download manager 702 to retrieve the retry configuration from the cache 710 while performing a version check of the mobile app 704. In this case, in response to the download manager 702 sending a version check query to the RBJIT 128 (or other server in the core network 108), the download manager 710 may receive modifications to the retry configuration and an indication of the latest versions of the mobile app 704. In another instance of external provisioning, the RBJIT 128 or other server may push the retry configuration to the download manager 702 as either a separate message containing the retry configuration or as a forced cache refresh request that forces the download manager 702 to update a stored version of its retry configuration. In any case, embodiments having an externally provisioned retry configuration may allow the RBJIT 128 and the download manager 702 to set the retry configuration in a manner that is independent of the particular versions of the mobile app 704.

FIGS. 8-11 present illustrative processes for implementing retry-and-backoff servicing. The processes are illustrated respectively as a collection of blocks in logical flow charts, which represent sequences of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the network architecture 100 of FIG. 1 and the RAB scheme of FIG. 7.

Figure 8:
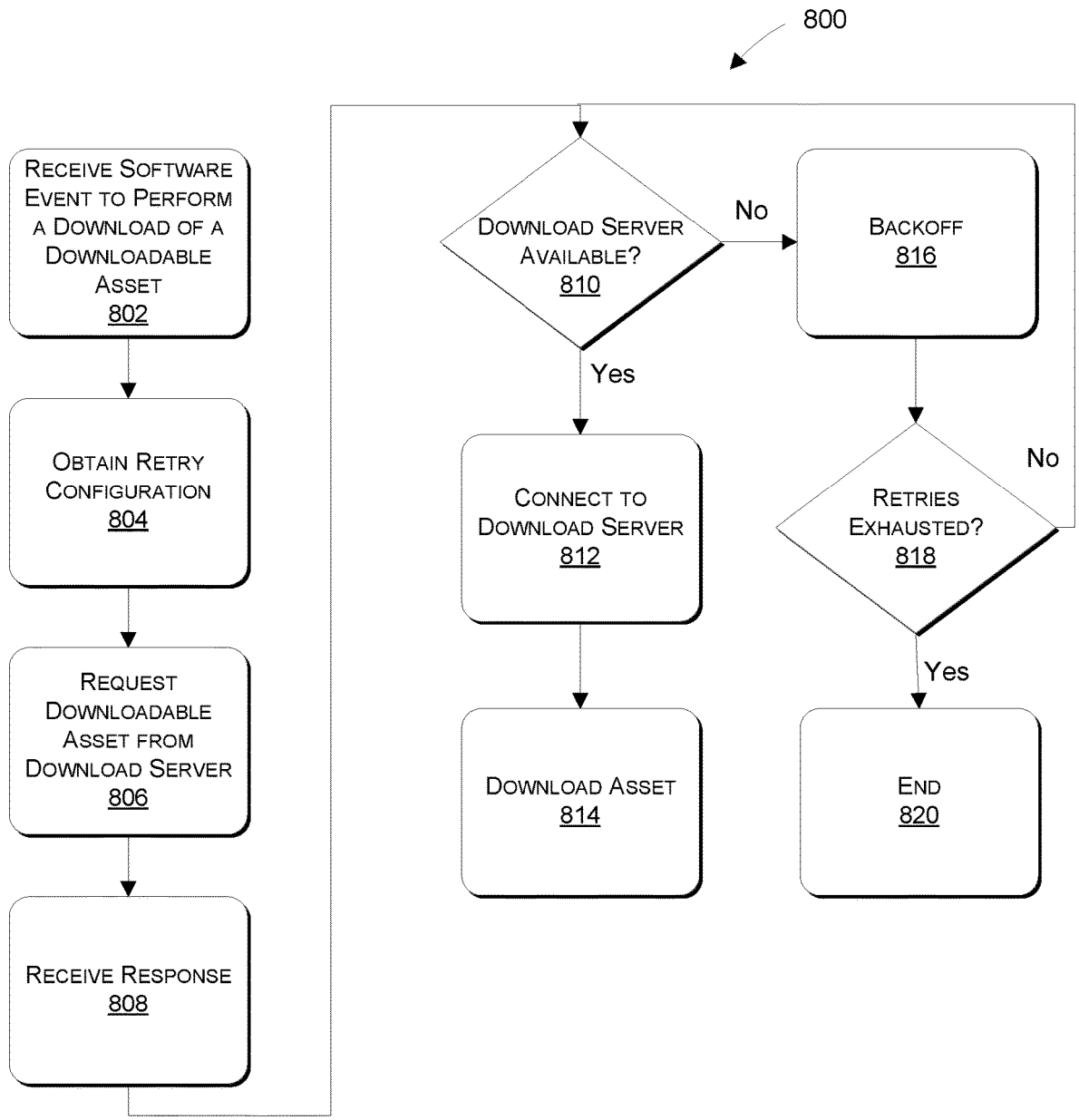
FIG. 8 is a flow diagram of an example process performed at least in part by the download manager for requesting a data asset for download and conducting an RAB in instances of server unavailability.

FIG. 8 is a flow diagram of an example process 800 performed at least in part by the download manager 702 for requesting a data asset for download and conducting an RAB in instances of server unavailability. At Block 802 of the illustrated example, the download manager 702 receives a software event to perform a download of a downloadable asset. The software event may be client-side such as a user-driven request entered via the user interface 204 for example, or it may be server-side such as a notification from the RBJIT 128 that a download is available. The software event may be automatically driven, such as by a machine learning model predicting that a user is likely to request access to content, and to proactively download or update the content in one example. The model may be built and the machine learning performed as described elsewhere herein.

At Block 804, the download manager 702 obtains the retry configuration corresponding to the downloadable asset. The retry configuration may be obtained by accessing a user profile, which may be stored in the memory 208 and retrieved to the cache 710 if not already present there. In some embodiments, the retry configuration may not be associated with a user profile and/or may be retrieved separately from a user profile.

At Block 806, the download manager 702 sends a request to the RBJIT 128 for a downloadable asset. In one or more embodiments, the request is sent to the RBJIT 128 via the API 708 and the RBJIT 128 in response attempts to access an appropriate download server 712 to obtain the asset.

At Block 808, the mobile device 104 receives a response via the API 708. The response may be a positive response, i.e., the requested asset, or a negative response 712, indicating that a download server is not available.

At Block 810, the download manager 702 determines whether a positive or negative response is received. If the attempt is successful (i.e., "yes" at Block 808), then the process 800 proceeds to Block 812 and the RBJIT 128 connects the download manager 702 to the accessible download server 712. At Block 814, the asset is downloaded.

However, if the attempt is unsuccessful (i.e., "no" at Block 810), then the response triggers the download manager 702 to begin the RAB process. Thus, at Block 816, the download manager 702 stops polling the RBJIT 128 for the time set in the retry configuration.

At Block 818, the download manager 702 determines whether a retry is permitted by the retry configuration. If so, and assuming that the interval has expired, the process returns to Block 810 and the download manager 702 polls the RBJIT 128 again. If a positive response is received this time at Block 810, then the download manager 702 is connected to the download server 712 at Block 812 and the asset is downloaded at Block 814. However, if a negative response is received, then the process 900 continues at Block 816 and the download manager 702 begins another retry interval.

At the expiration of the interval, at Block 818, the download manager 702 determines whether another retry is possible according to the retry configuration. If so, then the process 800 returns to Block 810 as before. However, if the retry configuration prohibits further attempts, then the process 800 moves to Block 820 and ends.

The RAB loop from Block 810 to Block 816 to Block 818 and back to Block 810 may continue until either the asset is downloaded or the maximum number of retries established in the retry configuration (if set) are exhausted.

Figure 9:
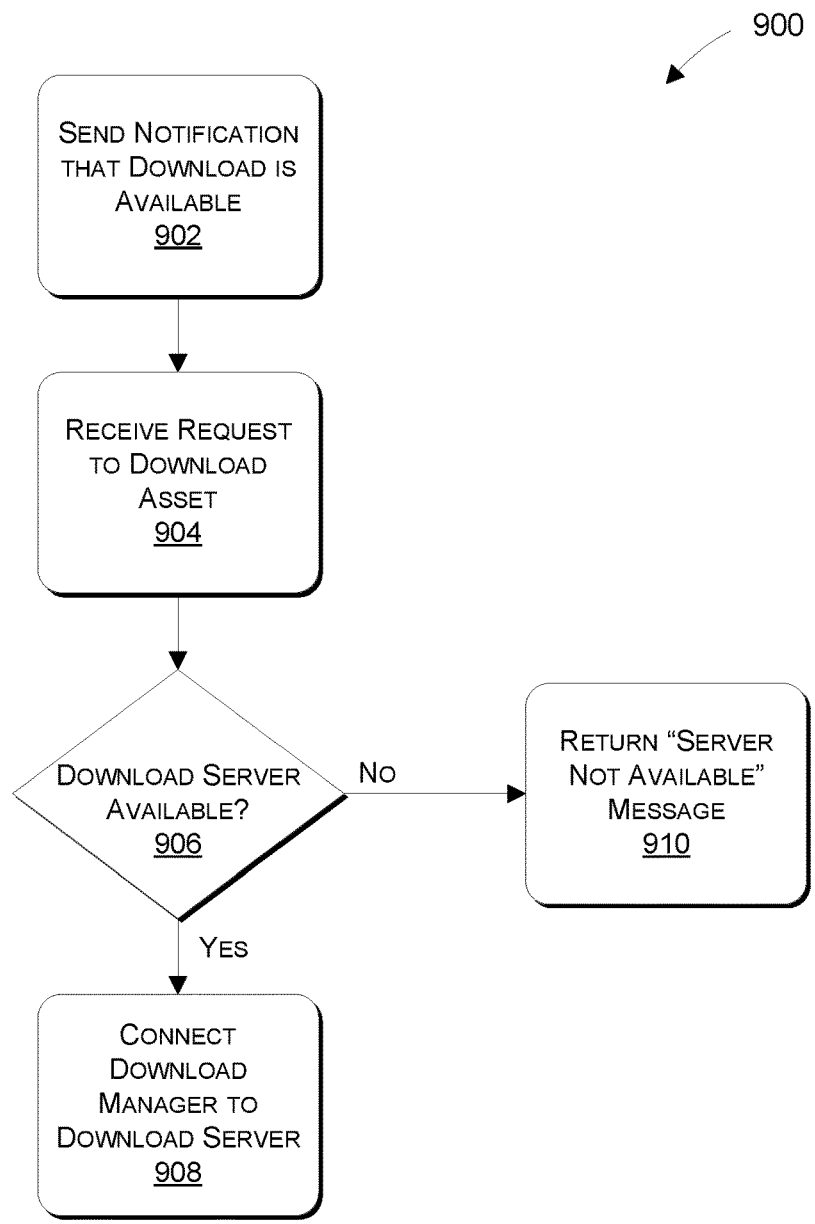
FIG. 9 is a flow diagram of an example process performed at least in part by the scheduling manager for identifying a download server for downloading a requested data asset.

FIG. 9 is a flow diagram of an example process 900 performed at least in part by the scheduling manager 706 for identifying a download server 714 for downloading a requested data asset. At Block 902, the scheduling manager 706 sends a notification to the download manager 702 that a downloadable asset is available.

At Block 904, the RBJIT 128 receives a request from the download manager 702 for the downloadable asset. In one or more embodiments, the API 708 receives the request to download the asset and the RBJIT 128 in response attempts to access an appropriate download server 712 to obtain the asset. In the meantime, the scheduling manager 706 on the RBJIT 128 tracks the request along with all other requests for the same asset from other devices. Block 904 will receive repeat requests from the download manager 702 during an RAB process until a connection is established as in Block 812.

At Block 906, the RBJIT 128 determines whether a download server 712 is available. If a download server 712 is available ("yes" at block 906) then the process 900 continues to Block 908, at which the scheduling manager 706 connects the download manager 702 to the available download server 712 via passing credentials and a network address of the requesting mobile device 104. If no download server 712 is available ("no" at Block 906) from which to download the asset, the scheduling manager 706 returns a "server not available" message via the API 708 (Block 910).

Figure 10:
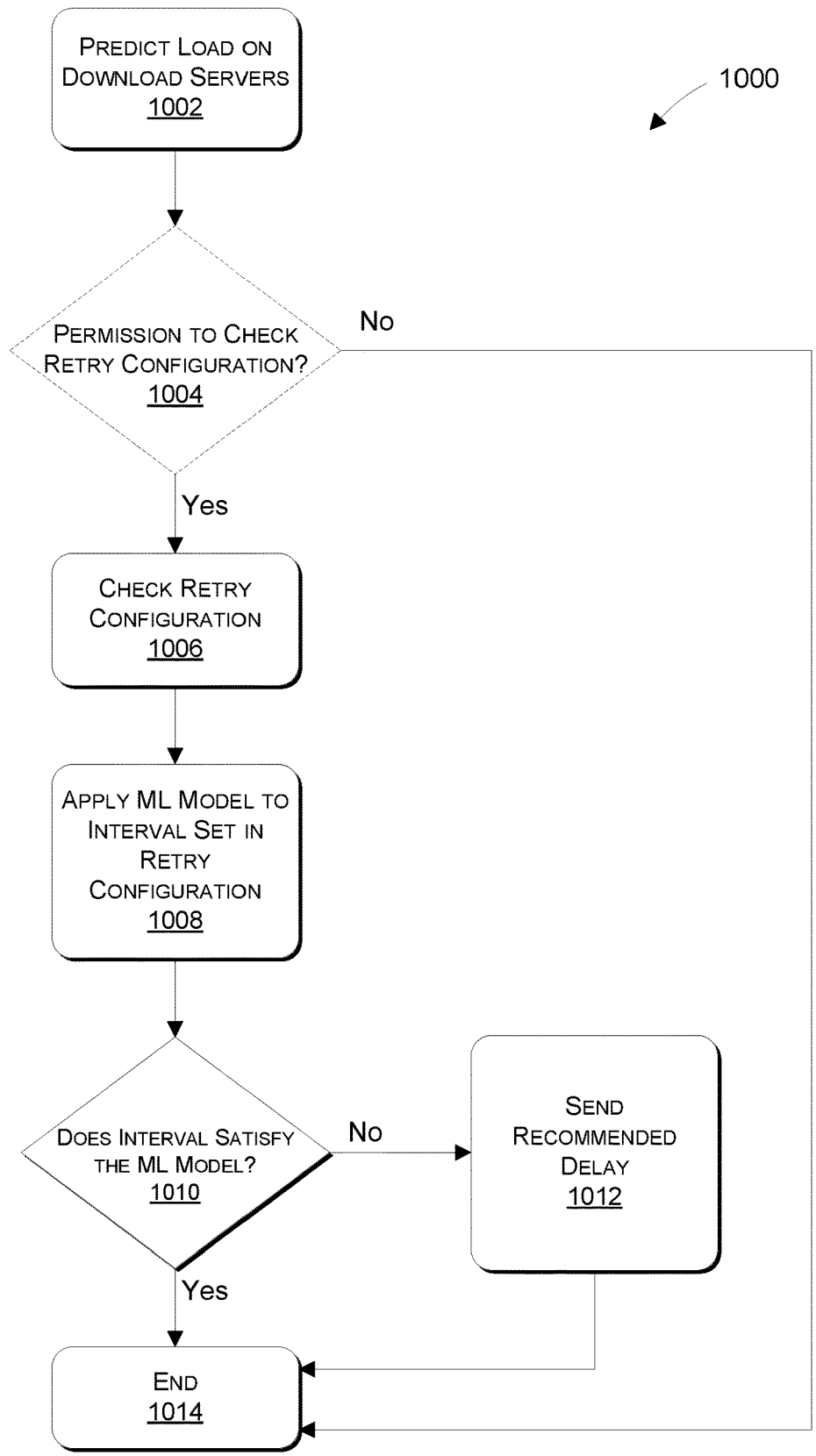
FIG. 10 is a flow diagram of an example process performed at least in part by the scheduling manager for responding to and/or modifying an RAB from the mobile device.

FIG. 10 is a flow diagram of an example process 1000 performed at least in part by the scheduling manager 706 for responding to and/or modifying an RAB from the mobile device 104. In some embodiments, the scheduling manager 706 makes recommendations for the retry interval based on the download server load. For example, a heavier load indicates a greater likelihood of server unavailability for downloading assets as described, for example, with respect to FIGS. 8 and 9, and so the scheduling manager 706 may recommend a longer retry interval in an effort to load balance and increase the likelihood that the next or nearly next retry will be successful in connecting to a download server 714.

At Block 1002, the scheduling manager 706 determines the load on the download server(s) 714. In some embodiments, the scheduling manager 706 may access a machine learning model (stored locally or accessed via a network) to predict load on the download server(s) 714 and, based on the load prediction, generate a direction or a recommended delay before retry. In other embodiments, the scheduling manager 706 may determine the current load on the download server(s) 714 and, based on the load determination, generate a recommended delay before retry. The recommended delay may be sent along with the "server not available" message in Block 910 or as a separate notification.

At Decision Block 1004, the scheduling manager 706 determines whether it has access privileges to check settings of the retry configuration 710. In some embodiments, opt-in must be set (or opt-out not set) to give the scheduling manager 706 access to settings in the retry configuration 710, including but not limited to the retry interval. In such embodiments, the scheduling manager 706 checks for opt-in or opt-out status and checks the retry interval setting after confirmation of this access right. The Decision Block 1004 is shown with dashed lines to indicate that this check is not present in some embodiments. For example, the check is not made if opt-in (or not opt-out) is already known to the scheduling manager 706 or if access privileges are granted to a carrier, e.g., in accordance with the terms and conditions of the user's subscription to the carrier's services.

If the scheduling manager has access privileges to the retry configuration (i.e., "yes" at Decision Block 1004), then the process 1000 goes to Block 1006, at which the scheduling manager 706 checks the retry configuration 710 and obtains the retry interval set there.

At Block 1008, the scheduling manager 706 applies the machine learning (ML) model to the obtained retry interval. In some examples, and without limitation, the ML model may have been trained using inputs of past requests and responses, and ensuing server loads, given similar types of downloads in similar conditions.

At Decision Block 1010, the scheduling manager 706 determines whether the retry interval satisfies the ML model. The retry interval satisfies the ML model if the model output predicts that the download servers will not be overloaded by RAB given the obtained retry interval. If the retry interval does not satisfy the ML model (i.e., "no" at Decision Block 1010), then the process 1000 proceeds to Block 1012.

At Block 1012, the scheduling manager 706 sends a recommended delay to the download manager 702. The recommended delay may be sent with the "server not available" notification. In some embodiments, receiving the recommended delay may trigger the download manager 702 to provide a notification message to the user 102, e.g., via the user interface 204. The notification may be via a dialog box, or via a smartphone notifications facility, or via SMS text message, to name a few examples. The download manager 702 may then delay the subsequent retry per the recommended delay, subject to the user response (i.e., prohibit modification to the retry configuration is "no" and permit modification if "yes") or failure to respond within a predetermined time ("no"). Conversely, if there is no recommended delay, or the recommended delay time has expired, the download manager 702 may proceed with a retry based on the retry configuration 710 without modification.

The recommended delay may be an entirely different retry configuration, replacing the current retry configuration, or a modification of the current retry configuration, which may be faster than the current retry configuration. For example, and without limitation, the scheduling manager 706 may check user records to see if the user 102 has paid for priority routing relative to other, non-priority users and, if so, provide an earlier download time (shorter retry interval) accordingly.

As noted above, the user 102 may be given the option to accept or refuse the new retry configuration 710 or modification. Additionally, or alternatively, one or more settings in the retry configuration 710 may be made overridable or not overridable by the user 102. In some embodiments, the new retry configuration or modification may be sent along with the "server not available" message.

In some embodiments, if the download manager 702 receives a recommended retry configuration or modification, the download manager 702 may confirm the user's eligibility for the change. For illustration, in the example given above, if the download manager 702 receives a recommended or modified retry configuration 710, the download manager 702 may check the user profile to see if the user 102 is eligible, (e.g., has paid for a service) to have priority routing. If the recommended retry configuration from the scheduling manager 706 is overridable, a user-selected retry configuration or parameter may be used instead. Otherwise, the recommended retry configuration is used.

Unless an expiration has been set, retries may continue until the asset has been downloaded. Alternatively, the RAB can be paused by the user 102 or by the scheduling manager 706. With one or more retries, a notification may be sent to the user, based on user profile settings. For example, the settings may reflect the user's preference to suppress such notifications, or to select a subset of notifications (such as success of the download).

If the retry interval satisfies the ML model (i.e., "yes" at Decision Block 1010), then the process 1000 proceeds to Block 1014 and ends. The download manager 702 will proceed with RAB based on the current retry configuration 710, without modification.

Figure 11:
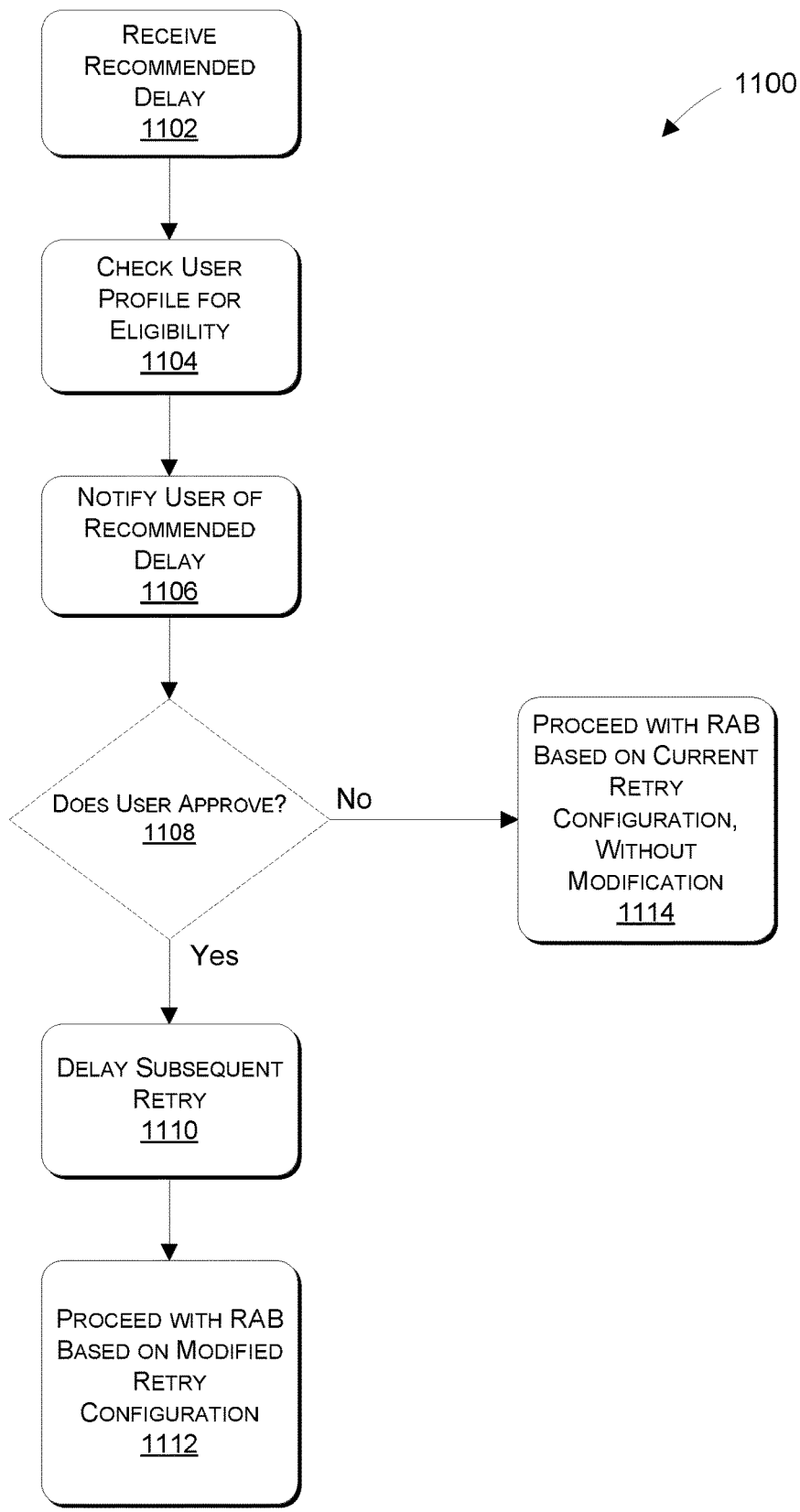
FIG. 11 is a flow diagram of an example process performed at least in part by the download manager for managing an RAB on the mobile device.

FIG. 11 is a flow diagram of an example process 1100 performed at least in part by the download manager 702 for managing an RAB on the mobile device 104. In some embodiments, the download manager 702 receives recommendations for the retry interval based on the download server load. For example, a heavier load indicates a greater likelihood of server unavailability for downloading assets as described, for example, with respect to FIGS. 8 and 9, and so the download manager 702 may receive a recommendation for a longer retry interval in an effort to load balance and increase the likelihood that the next or nearly next retry will be successful in connecting to a download server 714.

At Block 1102, the download manager 702 receives a recommended delay message from the scheduling manager 706. The recommended delay may be sent by the scheduling manager 706 with a "server not available" notification in response to a request for download.

In some embodiments, in response to receiving the recommended retry configuration or modification, the download manager 702 may confirm the user's eligibility for the change. At Block 1104, the download manager 702 may check the user profile to see if the user 102 is eligible, (e.g., has paid for a service) to have priority routing, for example. Block 1104 may occur at any point in the process 1100. One or more settings in the retry configuration 710 may be made overridable or not overridable by the user 102. If the recommended retry configuration from the scheduling manager 706 is overridable, a user-selected retry configuration or parameter may be used instead. Otherwise, the recommended retry configuration is used, subject to user approval or other condition as described herein.

At Block 1106, the recommended delay message may trigger the download manager 702 to provide a notification message to the user 102, e.g., via the user interface 204. The notification may be via a dialog box, or via a smartphone notifications facility, or via SMS text message, to name a few examples.

At Block 1108, the download manager 702 may determine whether the user approves the recommended delay. In some embodiments, Block 1108 may be omitted, as shown by its dashed lines, in favor of an automatic response by the download manager 702 to implement the delay recommended by the scheduling manager 706, automatically refuse the recommended delay, or automatically implement a different delay irrespective of the recommended delay. Such automatic responses may be preset by the user or otherwise in the retry configuration 710.

If the result of the Decision Block 1108 is "yes", the process 1100 may proceed to Block 1110. At Block 1110, the download manager 702 may, in accordance with the decision, modify the retry configuration 710 and delay the subsequent retry per the recommended delay. If the recommended delay time has expired, the download manager 702 may proceed with a retry based on the retry configuration 710 without modification.

At Block 1112, the download manager 702 proceeds with the RAB in accordance with the recommended delay. The modified interval will be observed through subsequent retries until another modification is received from the scheduling manager 706 (and approved by the user 102, if applicable) or the download manager 702 or user 102, or another instigator, reverts to the previous configuration or changes to another modified version. Terms and conditions of the subscriber agreement may dictate these and other changes.

If the result of the Decision Block 1108 is "no," the process 1100 may proceed to Block 1114. At Block 1114, the download manager 702 proceeds with the RAB in accordance with the current settings of the retry configuration 710, without modification, as described elsewhere herein.

The recommended delay may be an entirely different retry configuration, replacing the current retry configuration, or a modification of the current retry configuration, which may be faster than the current retry configuration. For example, and without limitation, the scheduling manager 706 may check user records to see if the user 102 has paid for priority routing relative to other, non-priority users and, if so, provide an earlier download time (shorter retry interval) accordingly.

Unless an expiration has been set, retries may continue until the asset has been downloaded. Alternatively, the RAB can be paused by the user 102 or by the scheduling manager 706. With one or more retries, a notification may be sent to the user, based on user profile settings. For example, the settings may reflect the user's preference to suppress such notifications, or to select a subset of notifications (such as success of the download).

In some embodiments, the download manager 702 may receive a notification from the scheduling manager 706 to proceed without modification. In other embodiments, the download manager 702 may proceed without modification by default, for example by backing off for the currently set retry interval and retrying at the end of the interval unless a notification has been received from the scheduling manager 706 to modify the interval set in the retry configuration 710. In such embodiments, if that notification includes a recommendation to modify the retry interval to a shorter interval and the recommended time for the interval has already passed, then the modified interval may be set to begin following a subsequent failed retry, subject to user approval in those embodiments in which user approval is required.

In some embodiments, the surfacing application 302 may perform smart downloads from the RBJIT 128. For example, the ML/CN engine 312 may track software events, including tracking attempted downloads of multimedia content, and at what times. The ML/CN engine 312 may also track reasons for failure, such as network congestion or resource contention of the files on the server side. The ML/CN engine 312 may then create or adjust one or more ML/CN data models to predict the best times to download files and minimize the number of failed downloads and subsequent retry and backoff attempts. In this way, while retry and backoff protect the RBJIT 128, the number of backoffs may be minimized.

As previously mentioned, the surfacing application 302 and the collector application 304 may collect information on a user opt-in basis. Furthermore, the RBJIT 128 may access one or both MNO data 314 and third-party source 316 data. The user may use the setting options for the surfacing application 302 or another application to perform per-field access control. For example, when an application 212 is installed, the RBJIT 128 may be notified. Field definitions associated with the installed application may be retrieved by a side lookup table. Those fields may be then served by the RBJIT 128 to the surfacing application 302 and the usage and behavior collection application 304 to allow the enumeration of configurable fields. In this way, the user 102 may be provided with access to data fields accessible by the RBJIT 128 platform, both on the mobile device 104 and on the RBJIT 128, and an MNO user profile where individual access rights (read/write) may be set.

To aid configuration, there may be either predetermined or user-defined groupings for fields where sets of fields may be set in bulk. The groupings may be labeled for ease of use. For example, all fields for applications 212 other than the surfacing application 302 may be labeled "Behavioral Fields" and may all be set to readable or not-readable with a single gesture all at once.

For fields of data that are subject to regulation, the RBJIT 128 may store in the DoD data store 310, or other storage, identities of those fields such that the mobile device surfacing application 302 and usage and behavior application 304 will be configured to prevent changing access rights to those fields. For example, social security and credit card information may be locked to unreadable to prevent accidental exposure of those regulated fields.

There are numerous mobile apps of every kind. Those that survive long enough to be worthy of improvement are updated at some point. Commonly, users such as the user 102 are notified that an update is available or become aware of an available update by the user or app querying, for example, an application server, an update server, or other server. However, a percentage of users do not obtain the updates as frequently as they are released. For example, if x % (x<100) of users update an app, and x % install a subsequent update to the app, only $x^2/100$ will have installed both updates. After a third update, only $x^3/104$ will be updated. In time, certain apps may lack substantial and potentially critical updates to security, bug fixes, and the like.

In general, a mobile client such as the mobile device 104 has a configuration file associated with one or more apps. The configuration file shows the version and a manifest associated with each of the apps. Updating as described herein may result in one app or multiple apps being updated (versioned). A configuration file may also be updated, with or without a corresponding app update. In some embodiments described herein, a "push" architecture is deployed, wherein the EIT server 126 or other server (such as an app server or update server) "pushes" an update to mobile clients such as the mobile device 104. A "pull" architecture, wherein the mobile client reaches out to request and download the update, is also contemplated.

In keeping with this, from time to time, updates may become available for the surfacing application 302 and the usage and behavior application 304. These applications may have updates deployed in sync with corresponding updates to the server side RBJIT 128. In other instances, the surfacing application 302 or the usage and behavior application 304 may be deprecated. To limit the operation of these applications after deprecation, an application kill switch may be employed as is discussed in further detail elsewhere.

In order to perform in-sync updates, the MNO may employ a remote forced update technique. Specifically, the surfacing application 302, the usage and behavior collection application 304, and the RBJIT 128 (and constituent software components) have a versioning file. Upon revising or updating the RBJIT platform and applications, the updated surfacing application 302 and collection application 304 are staged (e.g., on the core network 108) for updating the corresponding versions on the mobile device 104. The core network 108 may provide the staging function in order to assist with software updates, as will be discussed in further detail below. The staging function may be hosted on the EIT server 126 itself, or the staging function may be provided on another server or its own separate server (e.g. a staging server).

Before downloading the update from the staging location, the RBJIT 128 may transmit a notification to the mobile device 104 (e.g., via a user interface module, to a view of an application that serves multimedia content, or via any mode that may be preset or selected by the user 102) to disable user input to the surfacing application 302 and the usage and behavior collection application 304. In this regard, the RBJIT 128 may check the applications before download to ensure that they are not running at time of update. In certain instances, to-be-updated applications are access-privileged, or even prevented from deleting or updating. In such a case, a copy may be made and the updated application downloaded and installed alongside the now-deprecated app, with appropriate changes to the configuration file.

In some embodiments, the forced-update check is stored in a trusted execution environment (TEE). A TEE includes memory in which is stored the software that starts up first on device boot. The TEE is set up by the OEM or carrier and thus is only accessible by the OEM or carrier. By this provision, malware masquerading as a legitimate update is prevented from being installed as part of a forced update from a compromised server.

At the mobile device 104, updating may be integrated with the mobile API to request the API 306 to identify the latest application version for the relevant application, and compare the same with the version of the application currently on the mobile device 104. The user interface 204 of the mobile device 104 may have a forced update pop-up, for example in the form of a call to action button, triggered by a notification received from the RBJIT 128 or from another server (such as an update server), to obtain the updated application from an app store such as the Google Play Store™. In some embodiments, the application may prevent the user 102 from using the surfacing application 302 or the usage and behavior collection application 304 as the case may be, until the latest version of the application is installed. In some embodiments, the surfacing application 302 and/or the usage and behavior collection application 304 may check for a forced update upon application launch and/or upon going from background to foreground. Going from background to foreground, in some instances, may occur when the surfacing application 302 and/or the usage and behavior collection application 304 are brought into focus on the mobile device 104 by the user 102 after being in a launched but minimized state. Checking for a forced update in such instances may prevent a minimized, background, or otherwise dormant version of application 302 and 304 on mobile device 104 from missing updates when accessed by the user 102.

The surfacing application 302 and the usage and behavior collection application 304, alternatively or additionally, may be pulled from installation, i.e., uninstalled. The old surfacing application 302 and usage and behavior collection application 304 as currently installed on the mobile device 104 may receive a notification from the RBJIT 128 with the new version. A comparison of the application versions may then trigger a forced update from the staging locations.

The staging function may be hosted by the EIT server 126 or it may be provided on its own separate server. In some embodiments, the staging function provides a dedicated resource for receiving software updates and transmitting them to each of the one or more mobile devices 104 without disturbing the RBJIT 128. For example, once a software update is ready, the RBJIT 128 may push the software update onto the staging function and notifies the one or more mobile devices 104 that the update is available. The staging function may store the software update on one or more digital staging locations. Upon receiving the notification, the one or more mobile devices 104 then access the staging function in order to download the update. In this way, each of the mobile devices 104 may receive the software update without occupying the RBJIT 128. Since the staging function manages distribution of all software updates, the RBJIT 128 may dedicate more of its resources to processing multimedia content.

Over time, applications become deprecated, or replaced by a different application, or become abandoned. To eliminate reliance in such cases, the RBJIT 128 may have a so-called "kill switch" function. A kill switch in one sense can be considered a form of forced update, in that it shuts off an application's functionality.

In some embodiments, the MNO may send a software notification to one or more user devices 104. The notification, for example, might concern deprecation of the surfacing application 302 or the usage and behavior collection application 304, although no limitation is intended. The message may be a modal message. The mobile device 104 receiving the notification may display a message to the user 102 informing of the deprecation. Upon acknowledgment, the mobile device 104 may then uninstall the application. Among other things, this permits shutting down the RBJIT 128 by the MNO without the risk that users 102 may try to access the RBJIT 128 after shut-down.

In some embodiments, the kill switch may be a Boolean field that is read by the surfacing application 302 and/or the usage and behavior collection application 304, where a value of "true" indicates that the kill switch is active and a value of "false" indicates that the kill switch is inactive. The kill switch field may be read by the surfacing application 302 and/or the usage and behavior collection application 304 upon each application launch and/or upon going from background to foreground. Further, similar to the retry and backoff configuration, the kill switch field may be provisioned externally to the surfacing application 302 and the usage and behavior collection application 304, either by the mobile device 104 receiving the kill switch value during a version check, or by a separate message sent from the core network 108 to the mobile device 104 with the kill switch value. Alternatively, or in addition to causing application uninstallation, the kill switch field may cause the surfacing application 302 and/or the usage and behavior collection application 304 to perform one or more of: terminating any services, threads or functions that are not immediately related to the kill switch, clearing all application cache and/or memory, and displaying an error message to the user 102. In some embodiments, the kill switch may be integrated with the retry and backoff configuration in order to provide additional traffic control techniques for the RBJIT 128. For example, the RBJIT 128 may selectively set the kill switch to active on one or more mobile devices 104 in situations where the RBJIT is overloaded.

Figure 12:
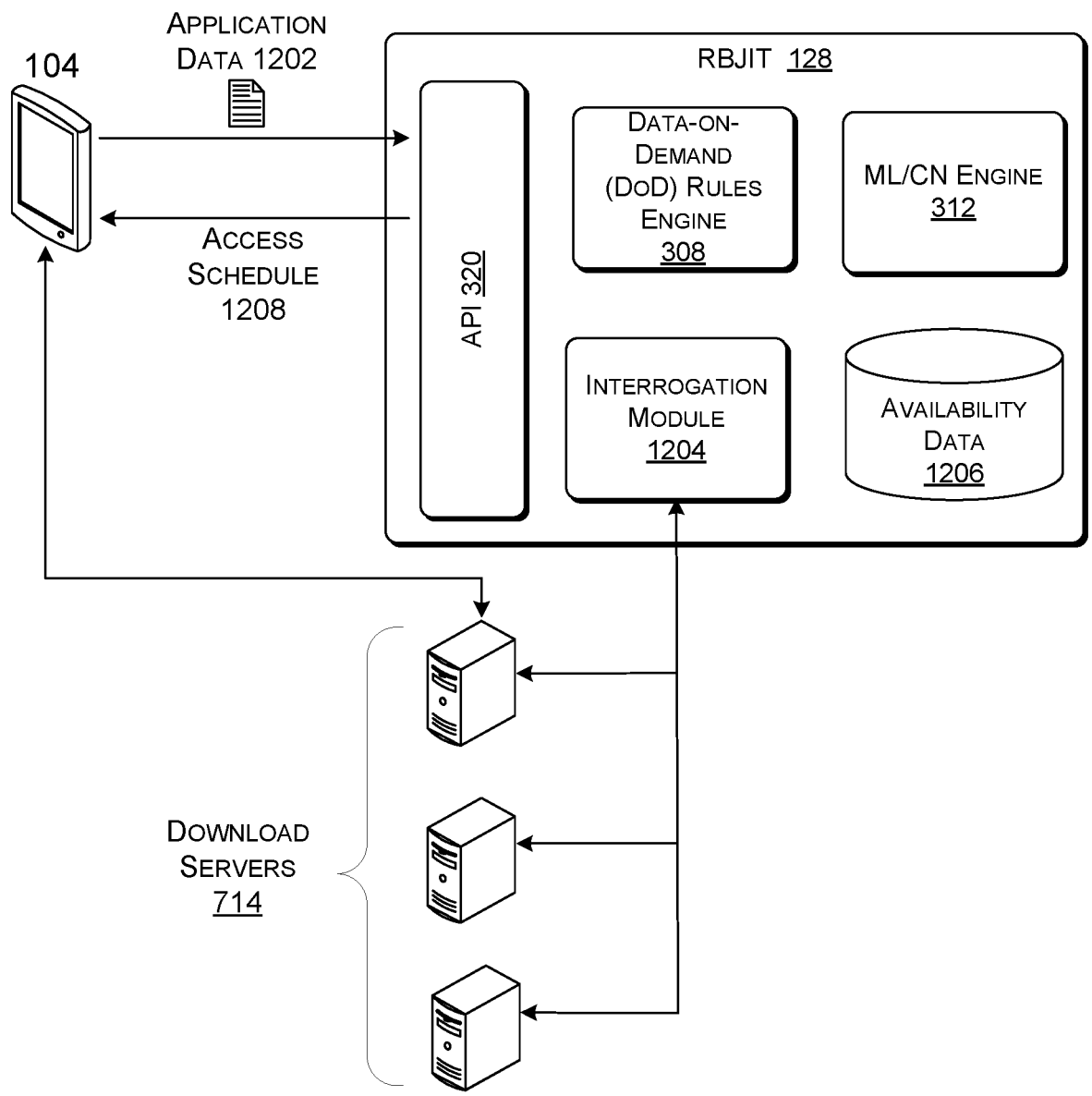
FIG. 12 depicts a block diagram illustrating a process in which a smart download may be implemented based on an access schedule generated based on historic availability for one or more download servers.

FIG. 12 depicts a block diagram illustrating a process in which a smart download may be implemented based on an access schedule generated based on historic availability for one or more download servers. In FIG. 12, an RBJIT 128 is depicted as being in communication with a mobile device 104 and one or more download servers 714. As noted elsewhere, communication between the mobile device 104 and the RBJIT 128 may be facilitated via an API 320.

In some embodiments, in addition to the functionality attributed to the DoD Rules Engine 308 elsewhere, the RBJIT may be further configured to facilitate downloads performed by a mobile device via an access schedule. In these embodiments, the RBJIT 128 may obtain application data 1202 from the mobile device 104 that includes an indication of one or more software applications installed upon the mobile device. In some cases, such application data may be obtained from a multitude of mobile devices in communication with the RBJIT 128. In some embodiments, the application data 1202 may be used to identify one or more software updates available to the mobile device. For example, the RBJIT may maintain a list of software updates available for particular software applications. In this example, the RBJIT may receive a notification (e.g., from a download server associated with a software application) each time that a new software update becomes available. In some embodiments, an update may be determined to be available to a mobile device based on a difference between a current version of a software application installed on the mobile device and a latest version of that software application as indicated by a download server for the software application. In these embodiments, an update may be determined to be available if the version of the software application installed on the mobile device is below the indicated latest version.

In some embodiments, the application data 1202 may be used to identify content (e.g., multimedia content) that should be downloaded by the mobile device. For example, content associated with (e.g., consumed by or presented using) a particular software application may be downloaded to a mobile device if that software application is installed on the mobile device. As previously noted, content to be downloaded to a mobile device may be identified by a surfacing application (e.g., surfacing application 302) as described elsewhere. In these embodiments, the surfacing application may identify (e.g., based on determined relevancy to a user) multimedia content that is likely to be of interest to a user in the future. The surfaced multimedia content may then be downloaded by the mobile device in anticipation that the user will, at some point in the future, request to access that multimedia content.

The RBJIT 128 may additionally maintain availability information for each of a number od download servers 714. For example, an interrogation module 1204 may periodically determine a current availability for one or more of the download servers 714 at particular times of each day. In this example, the interrogation module 1204 may ping each download server at different times of the day and determine a latency or response time of the respecting download server at that time. Detected response times for each download server 714 may be recorded with respect to a time at which the response times were obtained.

As noted elsewhere, the RBJIT 128 may include a machine learning and/or cognitive network/cognitive computing (ML/CN) 312. In some cases, the ML/CN Engine 312 may be further configured to generate an availability patterns for one or more of the download servers 714 based on the availability information (e.g., response times) obtained for each of the download servers. For example, the ML/CN Engine 312 may generate an availability pattern for a particular server that includes an indication of a degree of availability for that server at particular dates and/or times. In this example, an availability pattern for a particular download server may indicate one or more times of the day that the download server may lack availability or may have longer response times based on historical availability data. Such an availability pattern may be stored in availability data 1206.

The RBJIT 128 may then generate an access schedule for the mobile device based on the software updates determined to be available to the mobile device and the availability pattern for each download server associated with such a software update. For example, each software application for which an update is available may be associated with a download server that maintains, and/or provides backend support for, that software application. In this example, an access schedule may be generated by identifying optimal time windows during which each update should be downloaded by the mobile application from a respective download server while availability for the download server is high. In some embodiments, optimal time windows for each update may be selected such that they do not overlap. In some cases, a size of a time window for a particular update may be determined based on a data load size of the update and an available download speed. An available download speed for a particular download server may be determined based on the availability pattern for that download server (at a time corresponding to the time window). In some cases, update downloads within the access schedule may be ordered based on a priority associated with each update.

Time windows may be identified for a particular access event and a particular mobile device based on a number of factors. In some embodiments, the RBJIT 128 may identify a number of available time windows for an access event based on the availability patterns determined for the corresponding download server as described elsewhere. Once a number of available time windows have been identified, the RBJIT 128 may assign a subset of those time windows to a mobile device, such that only certain mobile devices will attempt to initiate the access event within any particular time window. In some cases, the RBJIT 128 may assign the set of time windows to the mobile device based on any suitable factors. For example, the set of time windows may be assigned to a mobile device based on how many other mobile devices have already been assigned to the time windows in the set of time windows. In this example, the RBJIT 128 may select the time windows having the fewest number of other mobile devices having been assigned to those time windows to be in the set of time windows. In some cases, a set of time windows for a particular access event may be selected based on factors that may include, but are not limited to, mobile device/content server location, a preferential status associated with the mobile device, a length of time that the mobile device has been in good standing with the RBJIT, or any other suitable factor. An access schedule 1208 may be generated to include separate sets of time windows for each of the identified access events.

Once an access schedule 1208 has been generated, the RBJIT 128 may provide that access schedule 1208 back to the mobile device 104. The access schedule may include instructions that cause the mobile device to conduct access events (e.g., downloads) via the access schedule.

In some embodiments, an access schedule may include a number of time windows associated with a single access event. In such embodiments, the mobile device may attempt to complete the access event during each of the indicated time windows. As described elsewhere, the RBJIT enables certain backoff and retry functions. In some embodiments, such functions may utilize an access schedule by first attempting a download of an update during the first occurring time window. If such a first attempt at download fails, then a retry attempt may be scheduled for the next occurring time window indicated within the access schedule. This may be repeated each time that the download attempt fails.

It should be noted that while certain functions are described as being implemented on a server (e.g., RBJIT 128), at least a portion of those functions may be implemented on the mobile device instead. One skilled in the art would recognize that such implementations might be equivalent to what is disclosed.

Figure 13:
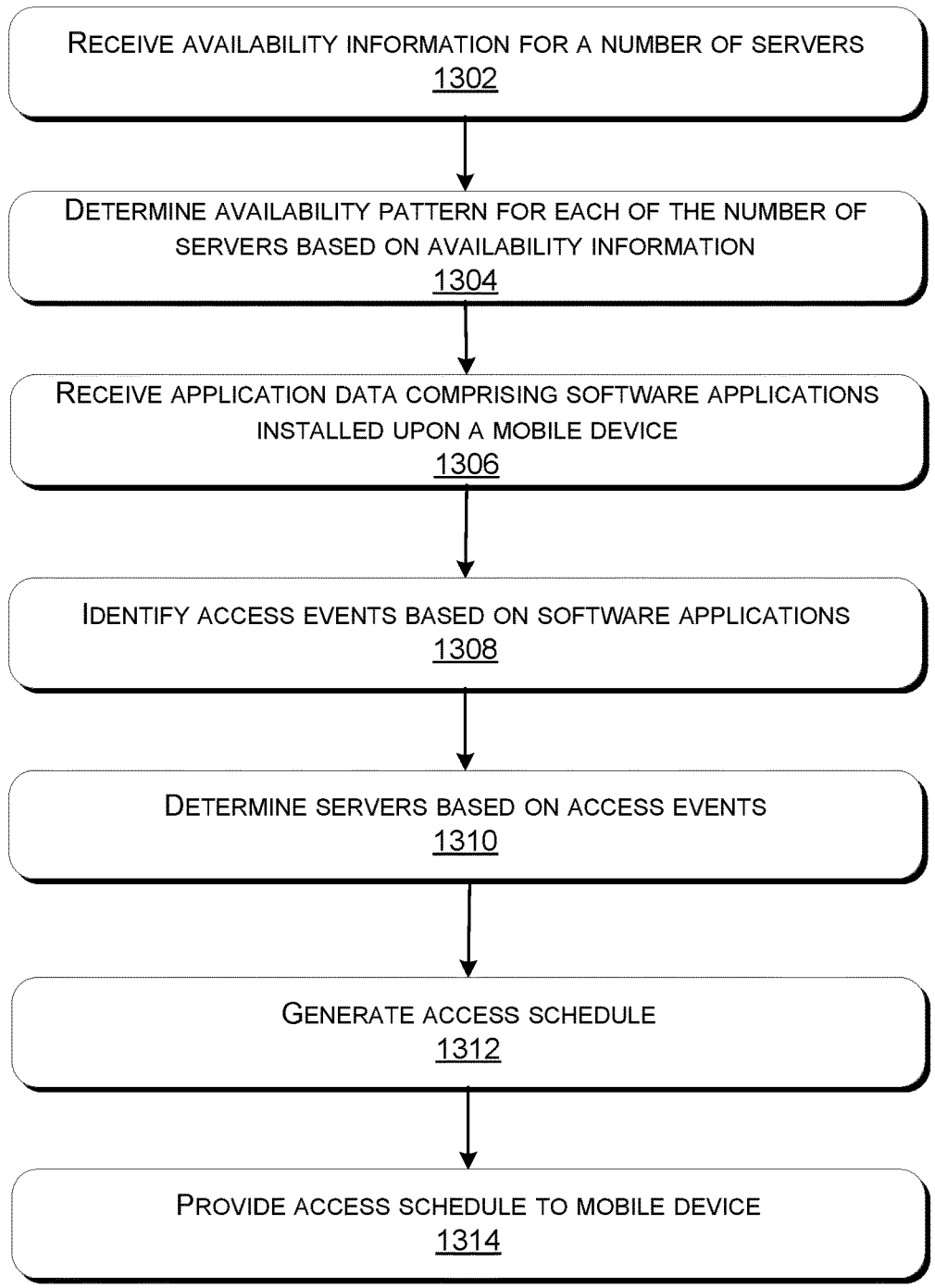
FIG. 13 depicts a flow diagram illustrating an example process for generating and providing an access schedule to a mobile device.

FIG. 13 depicts a flow diagram illustrating an example process for generating and providing an access schedule to a mobile device. In some embodiments, the process 1300 may be performed by a RBJIT, such as RBJIT 128 as described with respect to FIG. 1 above.

At 1302, the process 1300 comprises receiving availability information for a number of servers. In some embodiments, the availability information comprises at least a latency or response time.

At 1304, the process 1304 comprises determining an availability pattern for each of the number of servers based on the received availability information. In some embodiments, the availability pattern comprises an indication of a degree of availability for a server at particular dates and/or times.

At 1306, the process 1306 comprises receiving application data comprising an indication of one or more software applications installed upon a mobile device.

At 1308, the process 1300 comprises identifying access events to be associated with the mobile device based on the software applications installed on the mobile device. In some embodiments, an access event comprises a download of an update (e.g., a software update) available for a software application of the number of software applications. In some embodiments, the one or more access events for the mobile device are identified based upon software updates becoming available for at least a portion of the number of software applications. For example, the RBJIT may determine that a current version of the software installed on the mobile device is not the latest version of that software application. In another example, the RBJIT may receive an indication that a software update for the software application has just become available.

At 1310, the process 1300 comprises determining a number of servers associated with the access events. For example, if the access events are downloads of software updates, the servers may be determined by virtue of being associated with the operation and/or maintenance of that software application.

At 1312, the process 1300 comprises generating an access schedule for the mobile device based on the availability patterns for the determined servers. In some cases, the access schedule for the mobile device is also generated based on other access schedules generated for additional mobile devices. The access schedule comprises a number of time windows, each time window associated with an access event of the one or more access events. In some embodiments, multiple time windows may be included within the access schedule that are associated with an access event. A length (e.g., in amount of time) of a time window of the number of time windows is determined based at least in part on a size of data associated with the access event of the one or more access events. In some cases, the time windows may be selected such that the number of time windows of the access schedule do not overlap. In some cases, the time windows in the access schedule may be ordered according to an order in which access events should be completed. For example, the number of time windows of the access schedule may be ordered based on a priority associated with the respective access events.

At 1314, the process 1300 comprises providing the access schedule to the mobile device. The mobile device may include instructions, such that upon receiving the access schedule, the mobile device is caused to execute the one or more access events in accordance with the access schedule. Executing an access event at the corresponding time window comprises initiating execution of the access event at some point during the time window. In some embodiments, an access event may not be initiated upon determining that a length of time associated with the access event would cause the access event to complete after the end of the time window. In some embodiments, executing each of the access events in the access schedule at the corresponding time window comprises initiating execution of an access event of the one or more access events at a first occurring time window within the access schedule. Upon determining that this execution of the access event is a failure, the process may comprise initiating execution of the access event at a next occurring time window within the access schedule.

In accordance with one or more embodiments described herein, techniques are provided to implement rules-based just-in-time (RBJIT) multimedia content streaming in a data-on-demand solution to overcome constraints to which mobile devices are particularly vulnerable for multimedia streaming, although the techniques, in whole or in part, may be applicable as well to some stationary user devices, and potentially even those having large form factors. In some embodiments, an RBJIT engine ("RBJIT") may collect from the mobile device information about a user, any groups that the user is associated with, and/or the set of all users in general. The RBJIT may preferentially select for user display ("surfacing") by the mobile device multimedia content and content suggestions based on this information, limiting payload response to surface only multimedia content which is required or requested to be shown in the user interface, with the greater likelihood that the surfaced multimedia content will be of interest to a user being substantially increased. In this way, among other improvements, browsing time for a user on a mobile device with a limited form factor is reduced, and network bandwidth is conserved by not surfacing multimedia content that the user ultimately will not view. Furthermore, as the RBJIT collects an increasingly large amount of information, predictions of user interest in multimedia content will continue to improve.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
receiving, from each of a number of servers, availability information for the respective server;
determining, based on the received availability information, an availability pattern comprising an indication of a degree of availability for each server of the number of servers;
receiving, from a mobile device, application data comprising an indication of a number of software applications installed upon the mobile device;
identifying one or more access events for the mobile device based upon the number of software applications;
determining a set of the number of servers associated with the one or more access events;
generating, based on availability patterns for each of the set of the number of servers, an access schedule for the mobile device, the access schedule generated to include a number of time windows, each of the number of time windows corresponding to an access event, wherein each respective time window of the number of time windows are selected by virtue of having the fewest other mobile devices assigned to the respective time window for the respective access event; and
providing the access schedule to the mobile device.

2. The computer-implemented method of claim 1, wherein the availability information comprises at least a latency or response time.

3. The computer-implemented method of claim 1, wherein the availability pattern comprises an indication of a degree of availability for a server at particular dates and/or times.

4. The computer-implemented method of claim 1, wherein the access event comprises a download of an update available for a software application of the number of software applications.

5. The computer-implemented method of claim 1, wherein the access schedule for the mobile device is also generated based on other access schedules generated for additional mobile devices.

6. The computer-implemented method of claim 1, wherein the mobile device is caused to execute the one or more access events in accordance with the access schedule.

7. The computer-implemented method of claim 1, wherein the one or more access events for the mobile device are identified based upon software updates becoming available for at least a portion of the number of software applications.

8. A computing device, comprising:
one or more processors; and
memory in which are stored computer-executable instructions that, if executed by the one or more processors, cause the one or more processors to perform operations comprising:
receiving, from each of a number of servers, availability information for the respective server;
determining, based on the received availability information, an availability pattern comprising an indication of a degree of availability for each server of the number of servers;
receiving, from a mobile device, application data comprising an indication of a number of software applications installed upon the mobile device;
identifying one or more access events for the mobile device based upon the number of software applications;
determining a set of the number of servers associated with the one or more access events;
generating, based on availability patterns for each of the set of the number of servers, an access schedule for the mobile device, the access schedule generated to include a number of time windows, each of the number of time windows corresponding to an access event, wherein each respective time window of the number of time windows are selected by virtue of having the fewest other mobile devices assigned to the respective time window for the respective access event; and
providing the access schedule to the mobile device.

9. The computing device of claim 8, wherein a length of a time window of the number of time windows is determined based at least in part on a size of data associated with the access event of the one or more access events.

10. The computing device of claim 9, wherein the number of time windows of the access schedule do not overlap.

11. The computing device of claim 8, wherein the number of time windows of the access schedule are ordered according to an order in which the respective access events should be executed.

12. The computing device of claim 8, wherein the number of time windows of the access schedule are ordered based on a priority associated with the respective access events.

13. A mobile device comprising:
one or more processors;
a user interface; and
memory in which are stored computer-executable instructions that, if executed by the one or more processors, cause the one or more processors to perform operations comprising:
providing, to a server, application data comprising an indication of a number of software applications installed upon the mobile device;
receiving, from the server, an access schedule for the mobile device, the access schedule comprising an indication of one or more access events and time windows corresponding to the one or more access events, the access schedule generated to include a number of time windows, each of the number of time windows corresponding to an access event, wherein each respective time window of the number of time windows are selected by virtue of having the fewest other mobile devices assigned to the respective time window for the respective access event; and
executing each of the one or more access events in the access schedule at a corresponding time window.

14. The mobile device of claim 13, wherein the one or more access events comprises downloading of software updates associated with the number of software applications.

15. The mobile device of claim 14, wherein the access event is not initiated upon determining that a length of time associated with the access event would cause the access event to complete after the end of the respective time window.

16. The mobile device of claim 13, wherein the access schedule includes multiple time windows associated with a single access event.

17. The mobile device of claim 16, wherein executing each of the access events in the access schedule at the corresponding time comprises initiating execution of an access event of the one or more access events at a first occurring time window within the access schedule.

18. The mobile device of claim 17, wherein the further cause the one or more processors to, upon determining that the execution of the access event of the one or more access events is a failure, initiating execution of the access event at a next occurring time window within the access schedule.

19. The mobile device of claim 13, wherein the one or more access events of the access schedule are executed in an order based on a priority associated with each of the one or more access events.

* * * * *